US012531333B1

(12) United States Patent
Wolf et al.

(10) Patent No.: US 12,531,333 B1
(45) Date of Patent: Jan. 20, 2026

(54) MICROSTRIP PATCH LOG PERIODIC ANTENNA (MSPLPA) SCALING METHODOLOGY USING NON-PLANAR ANTENNA GEOMETRIES AND ADDITIVE MANUFACTURING

(71) Applicant: Rockwell Collins, Inc., Cedar Rapids, IA (US)

(72) Inventors: Jeremiah D. Wolf, Atkins, IA (US); Ross K. Wilcoxon, Cedar Rapids, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 104 days.

(21) Appl. No.: 18/658,316

(22) Filed: May 8, 2024

Related U.S. Application Data

(60) Provisional application No. 63/466,842, filed on May 16, 2023.

(51) Int. Cl.
*H01Q 1/52* (2006.01)
*H01Q 9/04* (2006.01)
*H01Q 21/06* (2006.01)

(52) U.S. Cl.
CPC ........... *H01Q 1/523* (2013.01); *H01Q 9/0414* (2013.01); *H01Q 9/045* (2013.01); *H01Q 21/065* (2013.01)

(58) Field of Classification Search
CPC ...... H01Q 1/523; H01Q 9/0414; H01Q 9/045; H01Q 21/065
See application file for complete search history.

(56) References Cited

U.S. PATENT DOCUMENTS 4,633,262 A 12/1986 Traut
5,400,040 A 3/1995 Lane et al.
5,648,786 A 7/1997 Chung et al.
6,621,463 B1 9/2003 Lam
6,816,128 B1 11/2004 Jennings
7,098,853 B2 8/2006 McGrath et al.
7,109,928 B1 9/2006 Thiele et al.
7,259,725 B2 8/2007 Wang et al.
7,583,233 B2 9/2009 Goldberg et al.
7,907,098 B1 3/2011 West
8,068,065 B1 11/2011 Struckman
10,454,185 B1 10/2019 Moran et al.
10,892,796 B1 1/2021 West et al.
11,367,959 B2 6/2022 Pance et al.
11,579,234 B2 2/2023 Moran et al.

(Continued)

FOREIGN PATENT DOCUMENTS

CN 116093595 A * 5/2023 ............... H01Q 1/38

OTHER PUBLICATIONS

Shirzadian Gilan et al., "Design of a wideband microstrip nanoantenna array," Optical and Quantum Electronics, 9 pages, Apr. 20, 2019.

*Primary Examiner* — Dieu Hien T Duong
(74) *Attorney, Agent, or Firm* — Suiter Swantz IP

(57) ABSTRACT

A microstrip patch log periodic antenna (MSPLPA) may include a ground plane, a dielectric material, a printed circuit board comprising a microstrip patches. Each of the microstrip patches may be configured to transmit and/or receive signals. The dielectric material may be disposed between the ground plane and the printed circuit board. Each of the microstrip patches may be frequency scaled.

20 Claims, 39 Drawing Sheets

(56) References Cited

U.S. PATENT DOCUMENTS

| | | | |
|---|---|---|---|
| 2005/0012655 | A1 | 1/2005 | Lalezari et al. |
| 2008/0012655 | A1 | 1/2008 | Stolpman |
| 2012/0181374 | A1 | 7/2012 | Williams |
| 2022/0271440 | A1 | 8/2022 | Pance et al. |
| 2022/0328970 | A1 | 10/2022 | Kozyrev et al. |

* cited by examiner

MICROSTRIP PATCH LOG PERIODIC ANTENNA (MSPLPA) SCALING METHODOLOGY USING NON-PLANAR ANTENNA GEOMETRIES AND ADDITIVE MANUFACTURING

CROSS-REFERENCE TO RELATED APPLICATIONS

The present application claims the benefit under 35 U.S.C. § 119(e) of U.S. Provisional Application Ser. No. 63/466,842, filed May 16, 2023, titled "MICROSTRIP PATCH LOG PERIODIC ANTENNA (MSPLPA) SCALING METHODOLOGY USING NON-PLANAR ANTENNA GEOMETRIES AND ADDITIVE MANUFACTURING", which is incorporated herein by reference in the entirety.

TECHNICAL FIELD

The present disclosure generally relates to antennas, and more specifically to log periodic antennas.

BACKGROUND

Microstrip Patch Log Periodic Antenna (MSPLPA) may include frequency coverage enabled by electrically scaling the antenna and performing a new patch design for every patch iteration along the MSPLPA. The MSPLPA include a dielectric material between patches and a ground plane. A height and a relative dielectric constant ($\varepsilon_r$) of the dielectric material is constant along the length of the MSPLPA such that the effective dielectric constant ($\varepsilon_{eff}$) of the dielectric material does not scale with the MSPLPA. Therefore, it would be advantageous to provide a device, system, and method that cures the shortcomings described above.

SUMMARY

In some aspects, the techniques described herein relate to a microstrip patch log periodic antenna including: a plurality of patches, wherein the plurality of patches are arranged in a log-periodic array, wherein the log-periodic array is periodic according to a scaling factor ($\tau$); a feed line, wherein the plurality of patches are connected to the feed line in parallel; a plurality of branch lines, wherein the plurality of branch lines are connected between the feed line and the plurality of patches; a first printed circuit board, wherein the plurality of patches, the feed line, and the plurality of branch lines are disposed on the first printed circuit board; a scaled dielectric, wherein the first printed circuit board is disposed on the scaled dielectric, wherein the scaled dielectric includes a top surface, a bottom surface, and a height (h) defined between the top surface and the bottom surface; a ground plane, wherein the scaled dielectric is disposed on the ground plane, wherein a top surface of the ground plane conforms to the bottom surface of the scaled dielectric; and a second printed circuit board, wherein the ground plane is disposed on the second printed circuit board, wherein a top surface of the second printed circuit board conforms to a bottom surface of the ground plane; wherein the scaled dielectric includes an effective dielectric constant ($\varepsilon_{eff}$), wherein the effective dielectric constant ($\varepsilon_{eff}$) is scaled according to the scaling factor ($\tau$).

In some aspects, the techniques described herein relate to a microstrip patch log periodic antenna, wherein the plurality of patches are one of rectangular, square, circular, elliptical, triangular, disc sectors, or ring sectors.

In some aspects, the techniques described herein relate to a microstrip patch log periodic antenna, wherein adjacent of the plurality of patches are disposed on alternating sides of the feed line.

In some aspects, the techniques described herein relate to a microstrip patch log periodic antenna, wherein the plurality of branch lines couple to the plurality of patches via one of an inset feed or a proximity coupling.

In some aspects, the techniques described herein relate to a microstrip patch log periodic antenna, wherein the height (h) of the scaled dielectric is constant along a length of the microstrip patch log periodic antenna.

In some aspects, the techniques described herein relate to a microstrip patch log periodic antenna, wherein the height (h) of the scaled dielectric is not constant along a length of the microstrip patch log periodic antenna.

In some aspects, the techniques described herein relate to a microstrip patch log periodic antenna, wherein the bottom surface of the scaled dielectric is a stepped bottom surface.

In some aspects, the techniques described herein relate to a microstrip patch log periodic antenna, wherein steps of the stepped bottom surface are disposed below respective of the plurality of patches.

In some aspects, the techniques described herein relate to a microstrip patch log periodic antenna, wherein a shortest step of the stepped bottom surface is disposed below a smallest of the plurality of patches and a tallest step of the stepped bottom surface is disposed below a largest of the plurality of patches.

In some aspects, the techniques described herein relate to a microstrip patch log periodic antenna, wherein adjacent of the plurality of patches are disposed on alternating sides of the feed line, wherein the stepped bottom surface includes alternate stepping.

In some aspects, the techniques described herein relate to a microstrip patch log periodic antenna, wherein the bottom surface of the ground plane is one of a horizontal bottom surface or a stepped bottom surface.

In some aspects, the techniques described herein relate to a microstrip patch log periodic antenna, wherein the bottom surface of the scaled dielectric is a wedged bottom surface, wherein the wedged bottom surface is set at an incline to the plurality of patches.

In some aspects, the techniques described herein relate to a microstrip patch log periodic antenna, wherein a shortest portion of the wedged bottom surface is disposed below a smallest of the plurality of patches and a tallest portion of the wedged bottom surface is disposed below a largest of the plurality of patches.

In some aspects, the techniques described herein relate to a microstrip patch log periodic antenna, wherein the bottom surface of the ground plane is a horizontal bottom surface, wherein a bottom surface of the second printed circuit board is a horizontal bottom surface.

In some aspects, the techniques described herein relate to a microstrip patch log periodic antenna, wherein the bottom surface of the ground plane is a wedged bottom surface, wherein a bottom surface of the second printed circuit board is one of a horizontal bottom surface or a wedged bottom surface.

In some aspects, the techniques described herein relate to a microstrip patch log periodic antenna, wherein the scaled dielectric includes a relative dielectric constant ($\varepsilon_r$), wherein the effective dielectric constant ($\varepsilon_{eff}$) is proportional to the relative dielectric constant ($\varepsilon_r$), wherein the relative dielectric constant ($\varepsilon_r$) is scaled according to the scaling factor ($\tau$).

In some aspects, the techniques described herein relate to a microstrip patch log periodic antenna, wherein the relative dielectric constant ($\varepsilon_r$) is smallest below a smallest of the plurality of patches and largest below a largest of the plurality of patches.

In some aspects, the techniques described herein relate to a microstrip patch log periodic antenna, wherein the first printed circuit board is a planar member, wherein the plurality of patches form a planar array.

In some aspects, the techniques described herein relate to a microstrip patch log periodic antenna, wherein the plurality of patches form a conformal array.

In some aspects, the techniques described herein relate to a microstrip patch log periodic antenna, wherein the first printed circuit board includes a planar surface and a curved surface, wherein one or more of the plurality of patches are disposed on the planar surface and one or more of the plurality of patches are disposed on the curved surface, wherein the conformal array is a one-dimensional conformal array.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
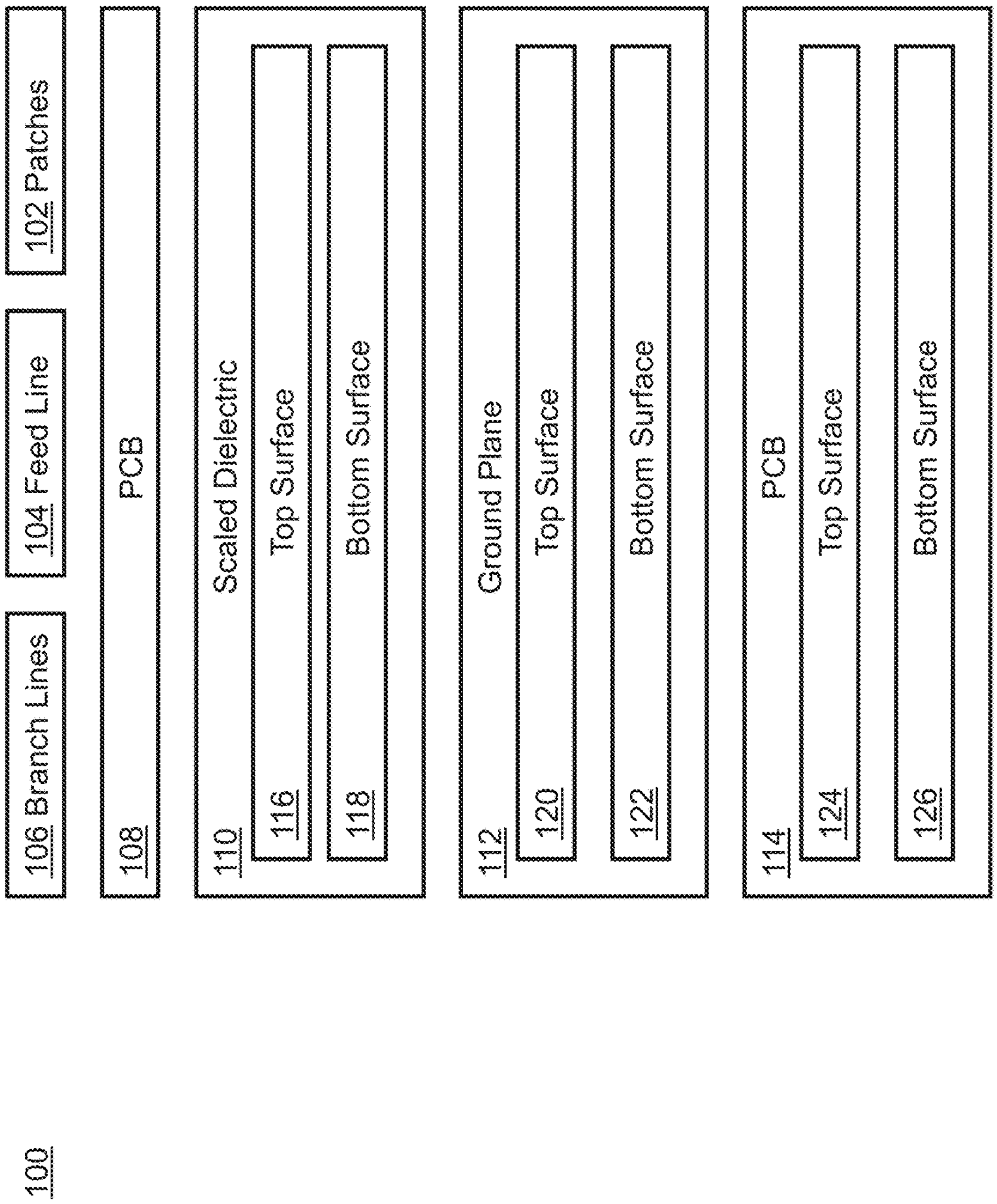
FIG. 1A depicts a simplified block diagram of a MSPLPA, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a microstrip patch log periodic antenna scaling methodology using non-planar antenna geometries and additive manufacturing. A microstrip patch log periodic antenna (MSPLPA) may include a ground plane, a dielectric material, a printed circuit board comprising a microstrip patches. Each of the microstrip patches may be configured to transmit and/or receive signals. The dielectric material may be disposed between the ground plane and the printed circuit board. Each of the microstrip patches may be frequency scaled.

Figure 1B:
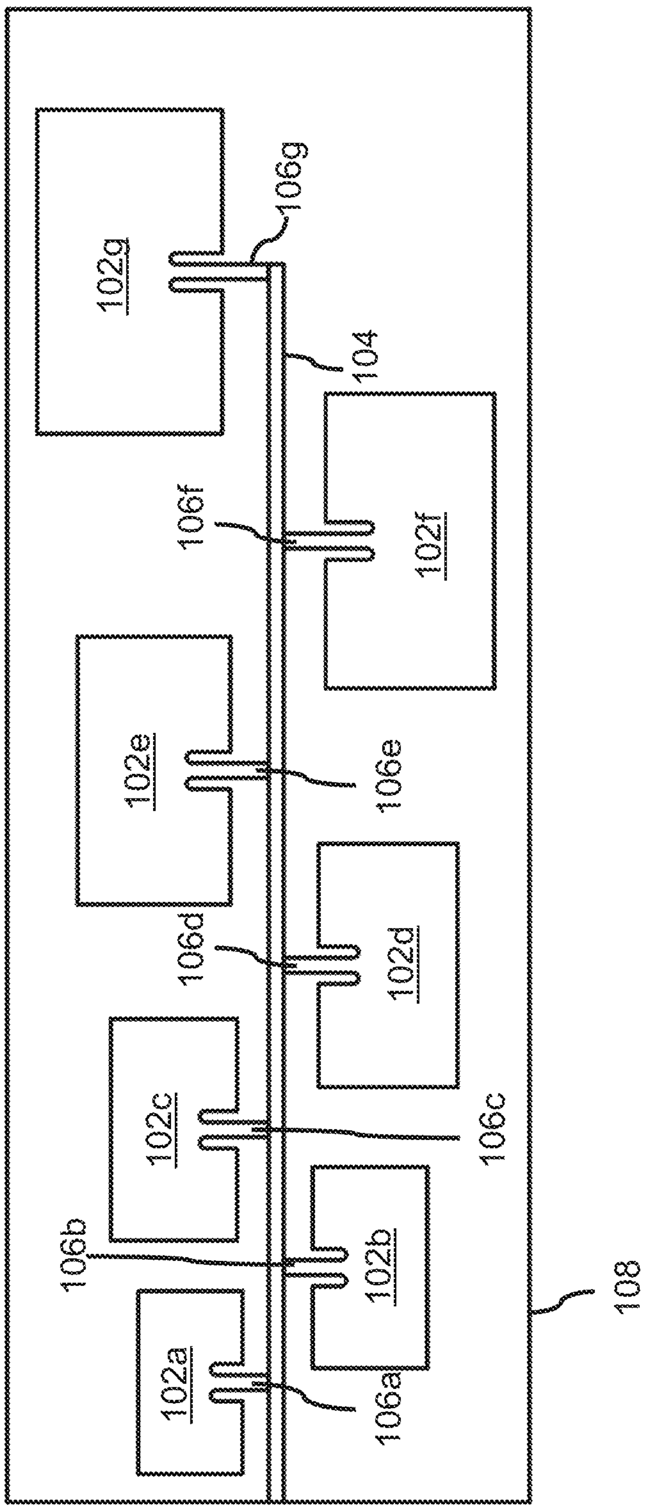
FIG. 1B depicts a top view of the MSPLPA, in accordance with one or more embodiments of the present disclosure.
Figure 1C:
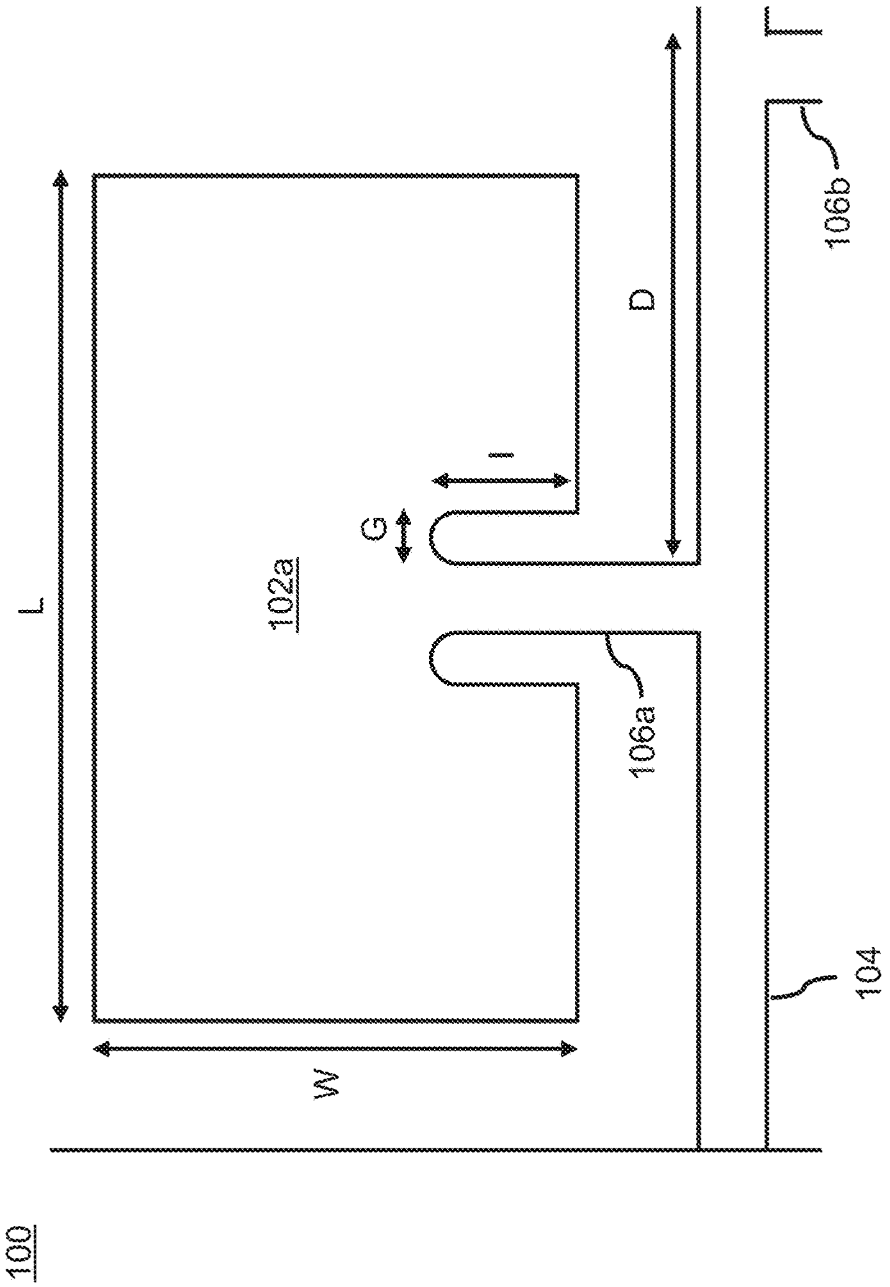
FIG. 1C depicts a partial top view of the MSPLPA, in accordance with one or more embodiments of the present disclosure.
Figure 2A:
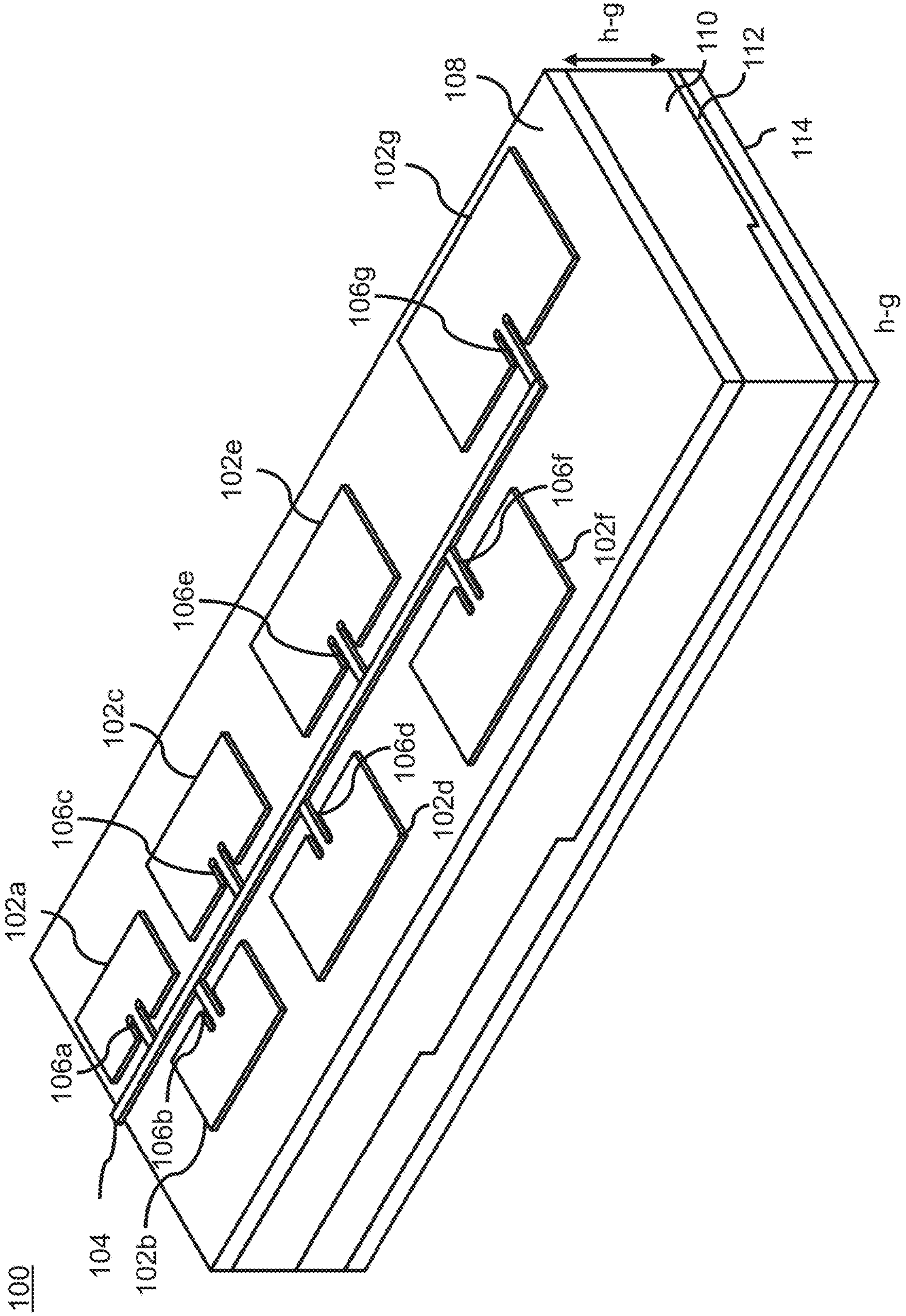
FIGS. 2A-2D depict a top-front perspective view, a top-rear perspective view, a top-front exploded view, and a bottom-front exploded view, respectively, of the MSPLPA, in accordance with one or more embodiments of the present disclosure.
Figure 2B:
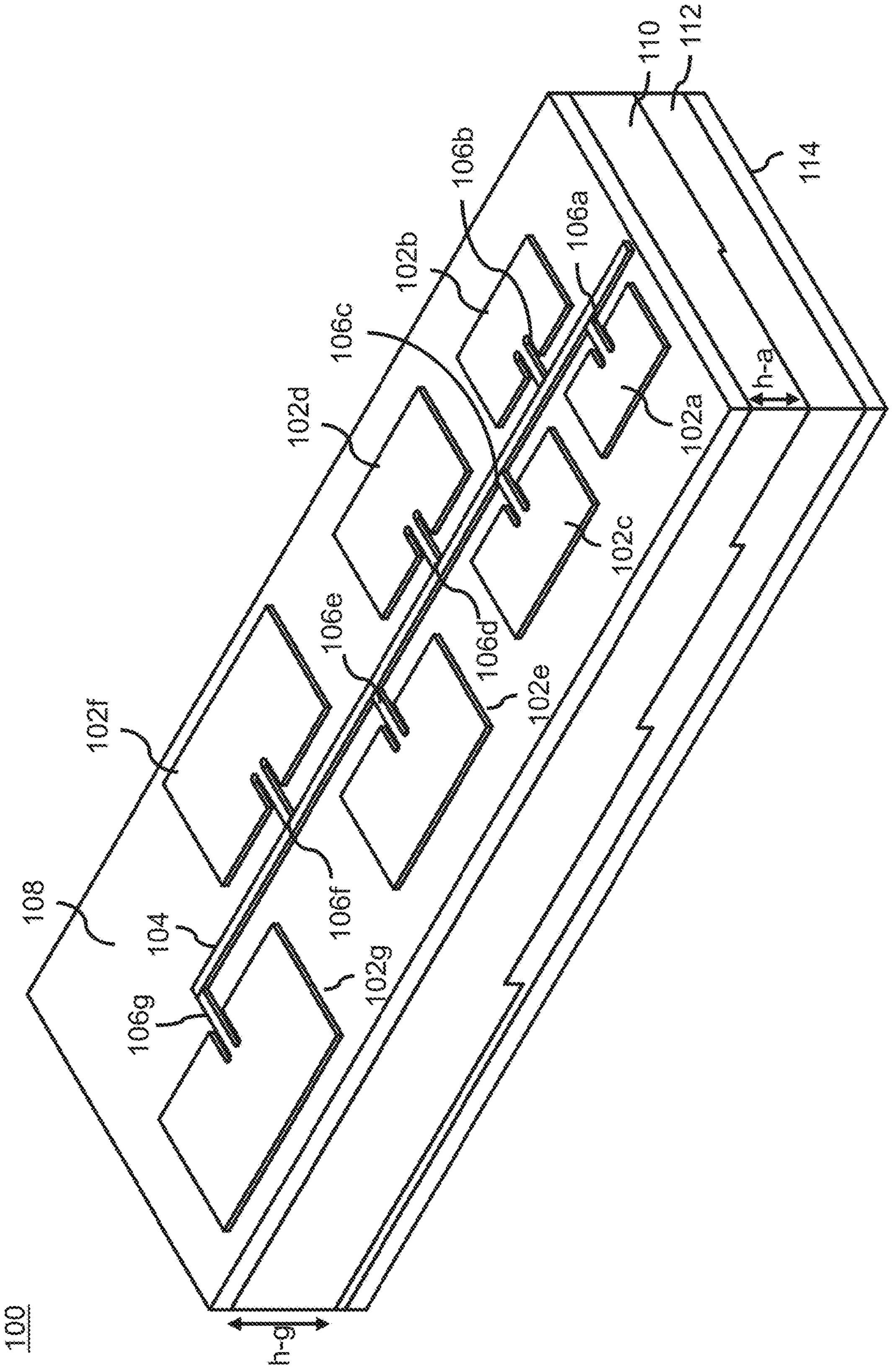
Figure 2C:
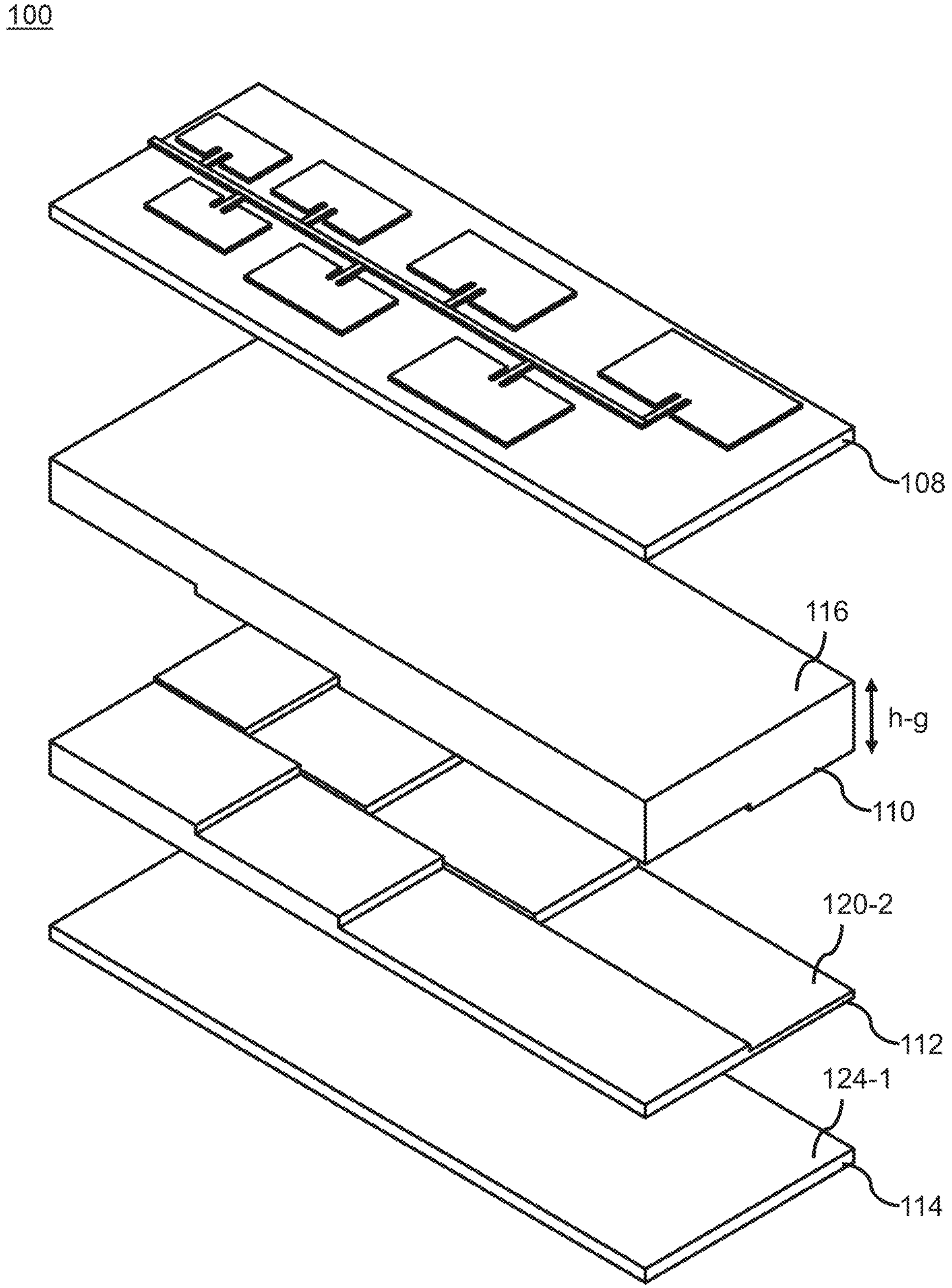
Figure 2D:
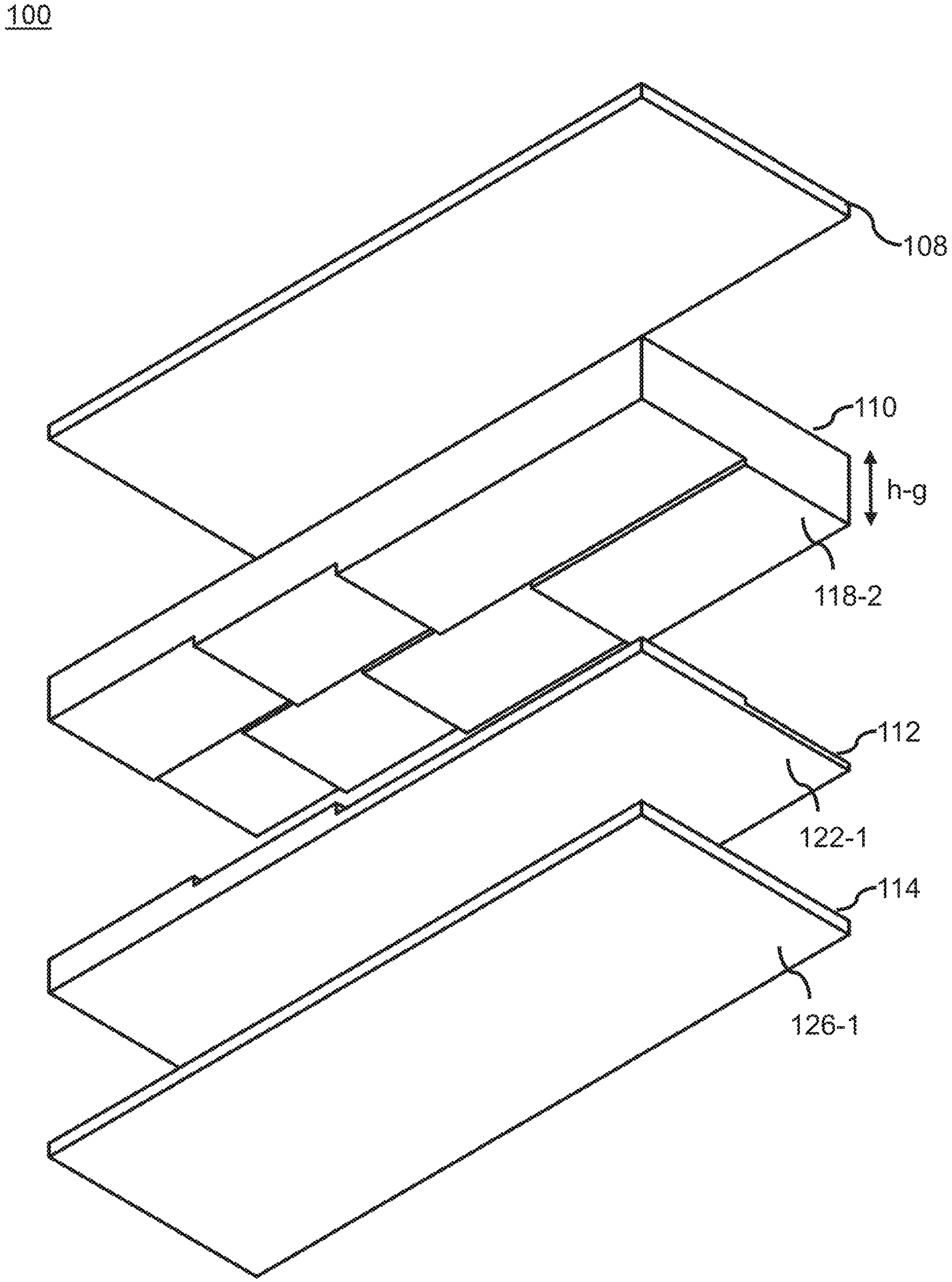
Figure 3A:
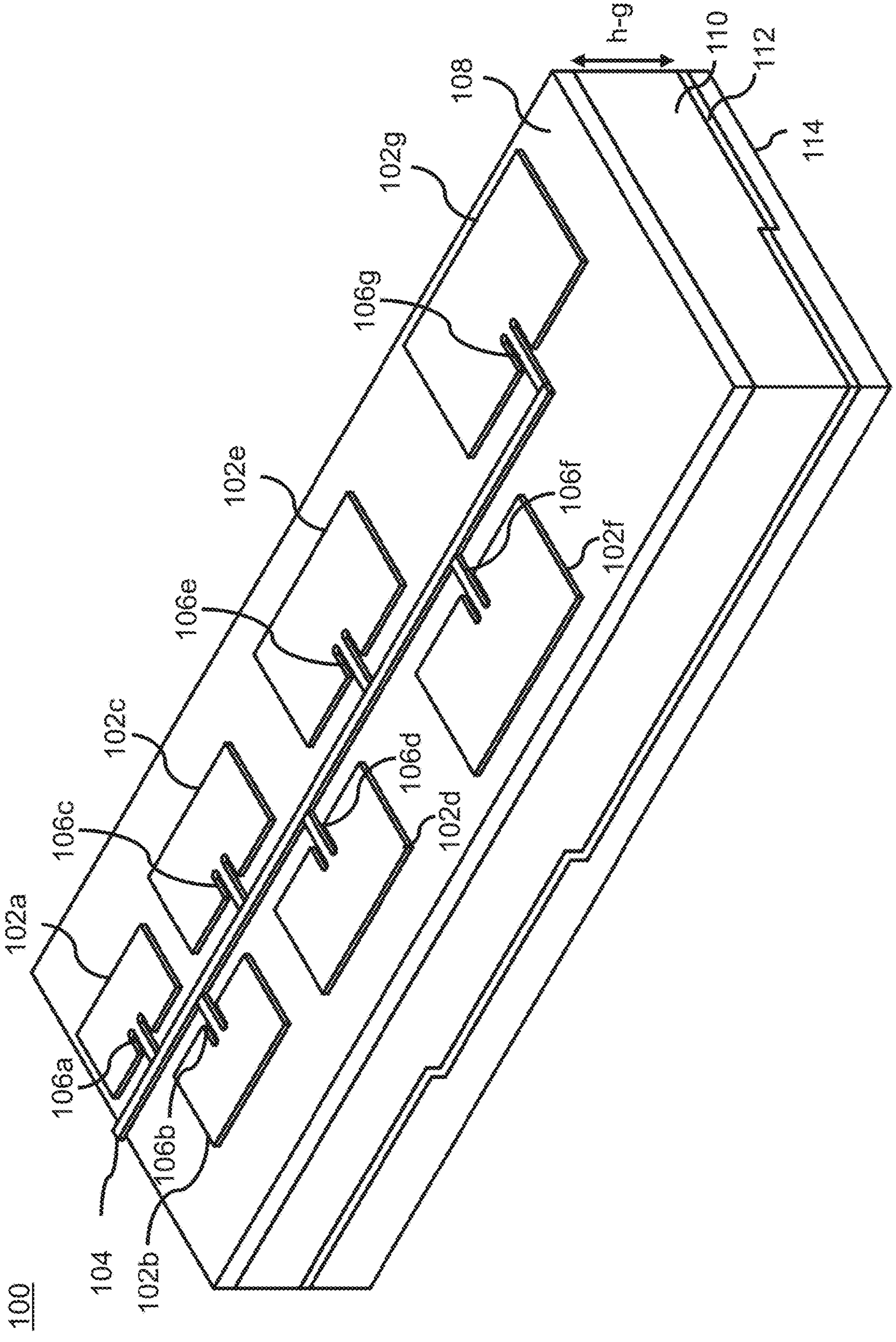
FIGS. 3A-3D depict a top-front perspective view, a top-rear perspective view, a top-front exploded view, and a bottom-front exploded view, respectively, of the MSPLPA, in accordance with one or more embodiments of the present disclosure.
Figure 3B:
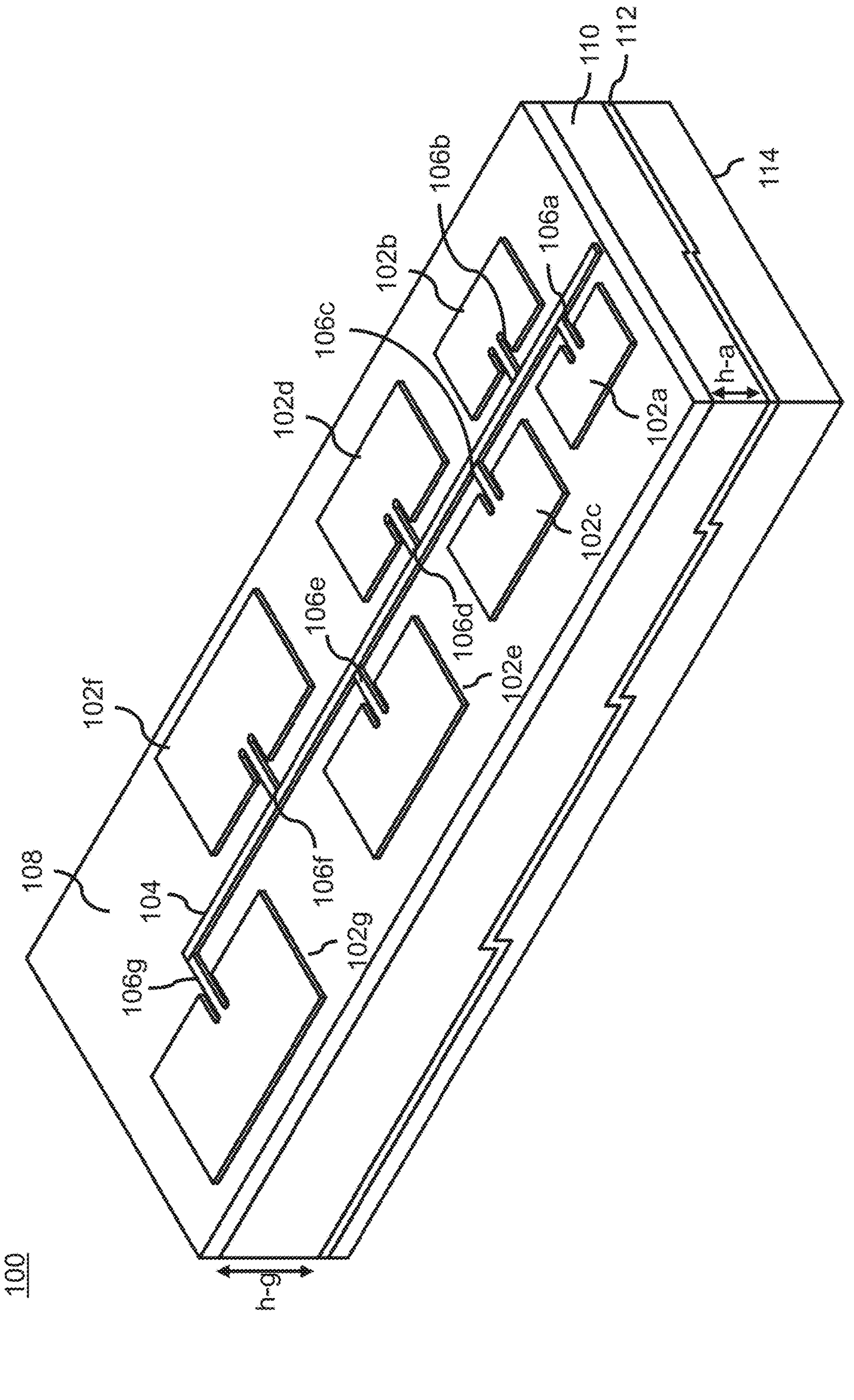
Figure 3C:
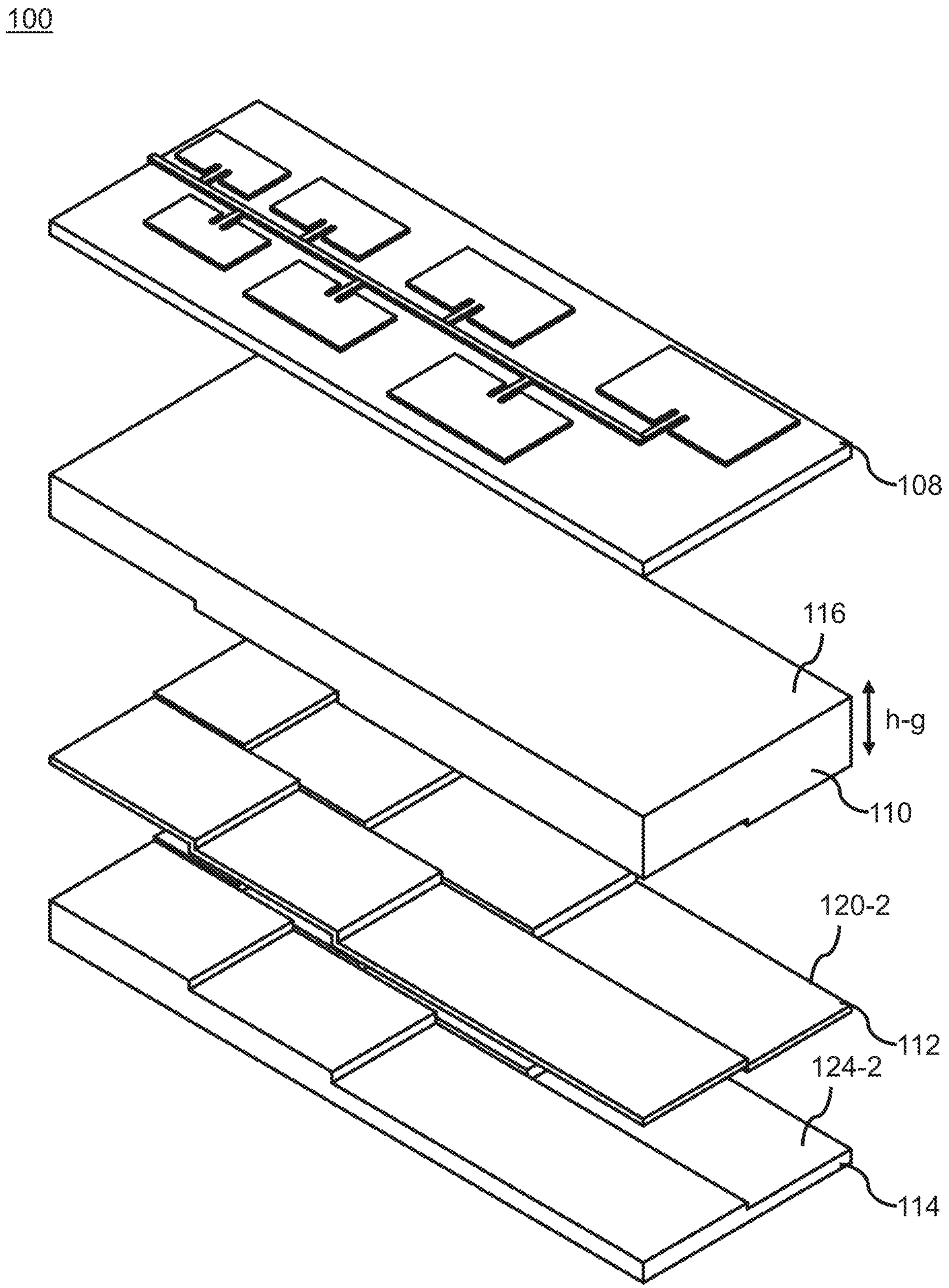
Figure 3D:
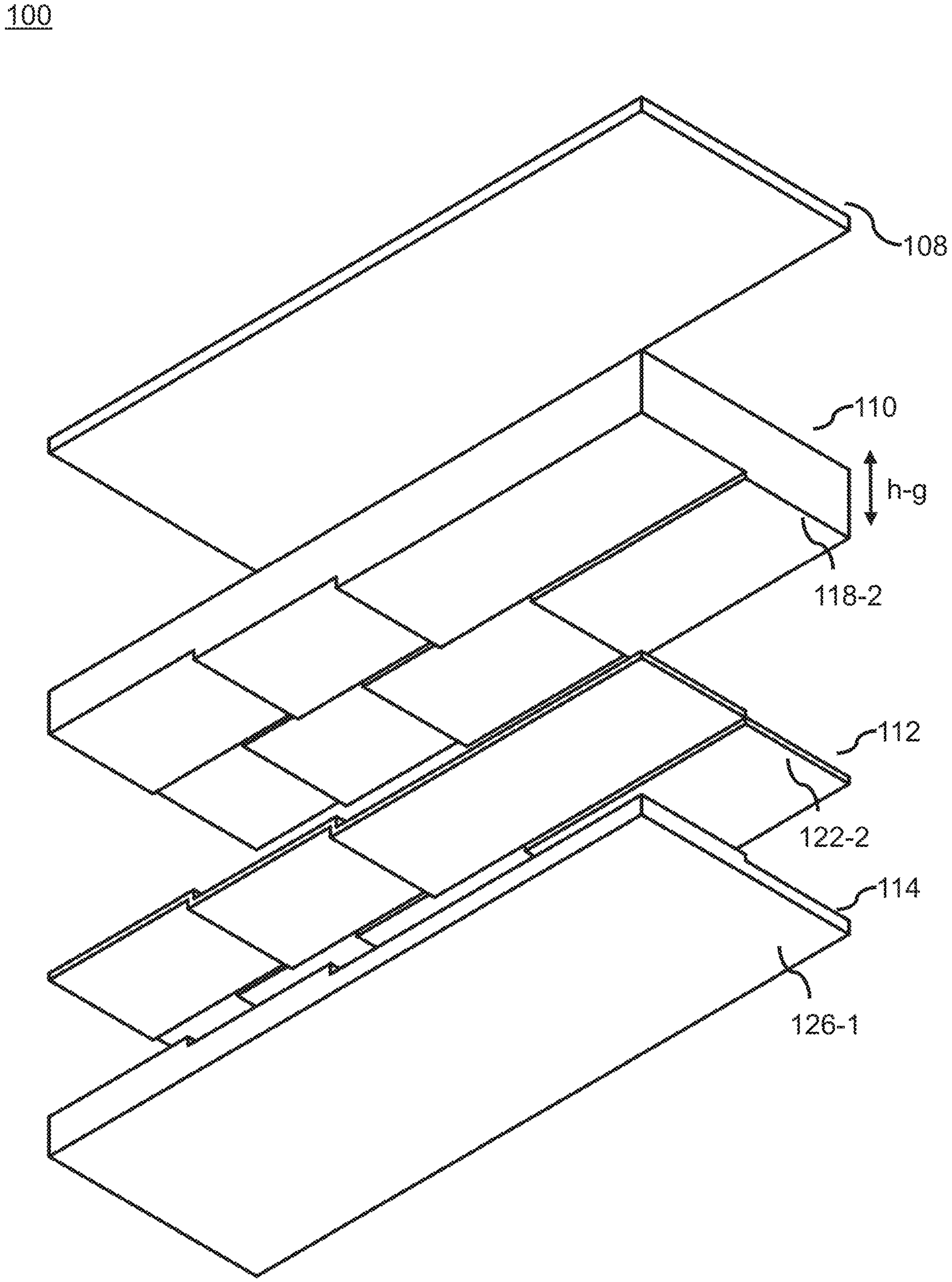
Figure 4A:
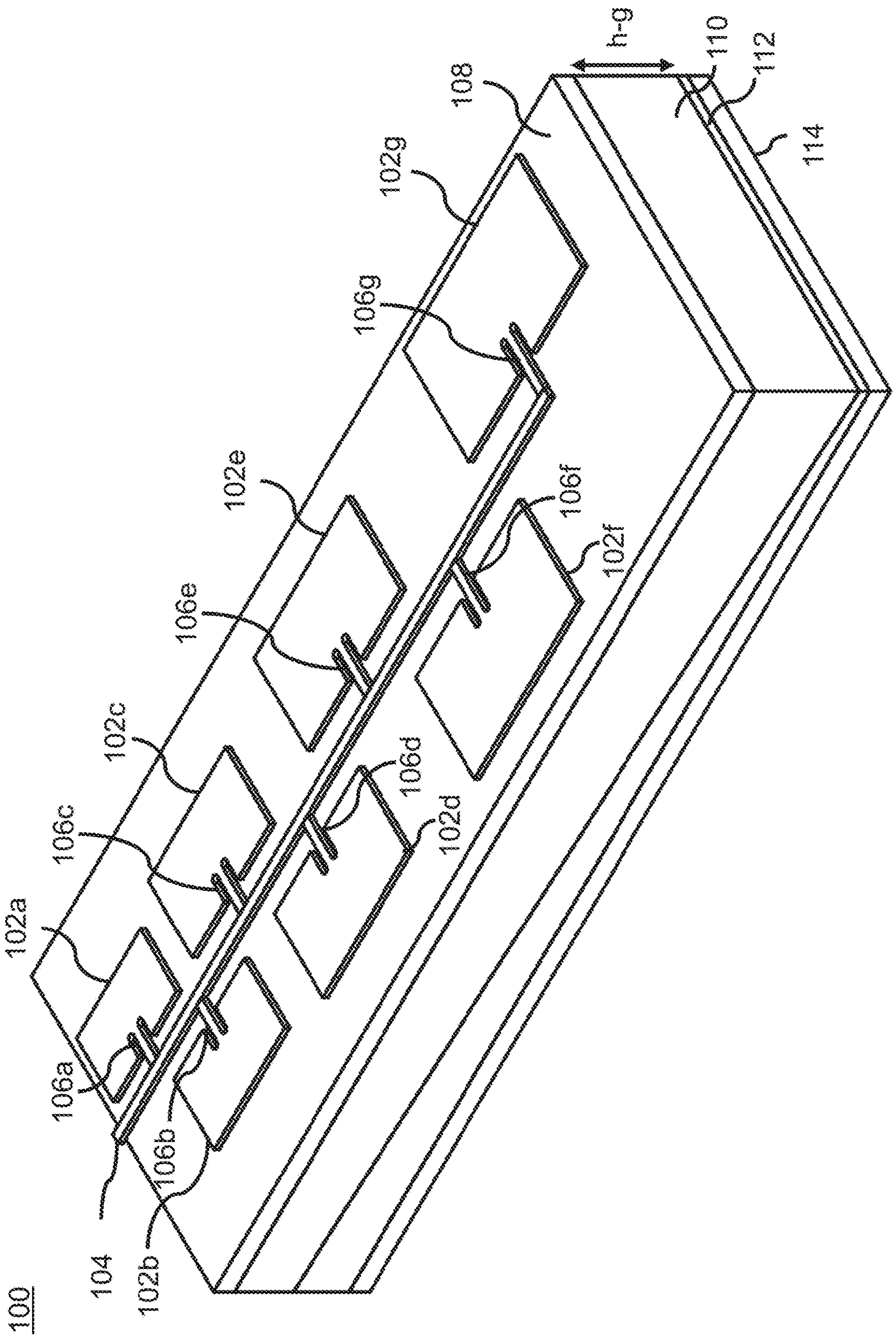
FIGS. 4A-4D depict a top-front perspective view, a top-rear perspective view, a top-front exploded view, and a bottom-front exploded view, respectively, of the MSPLPA, in accordance with one or more embodiments of the present disclosure.
Figure 4B:
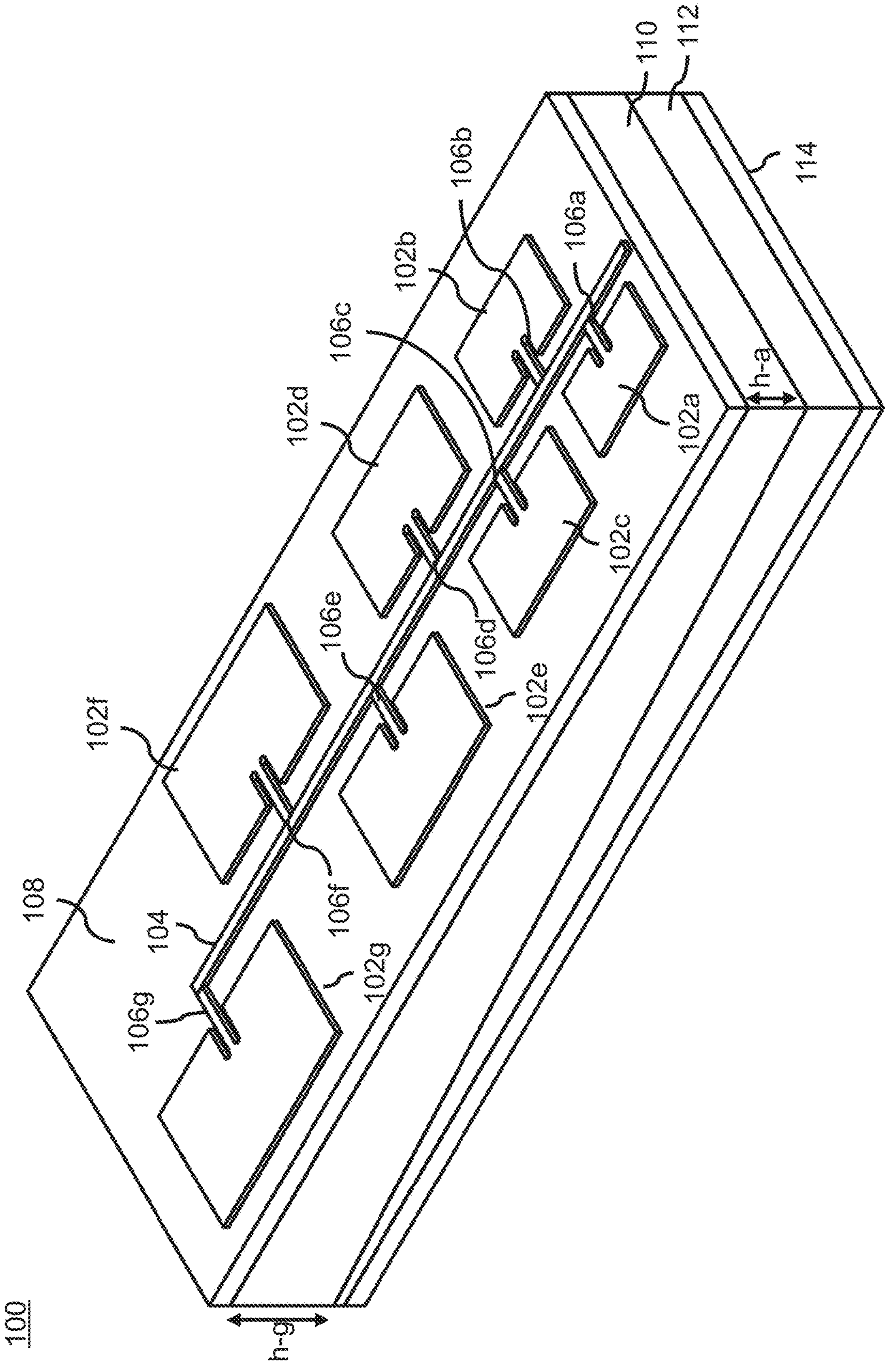
Figure 4C:
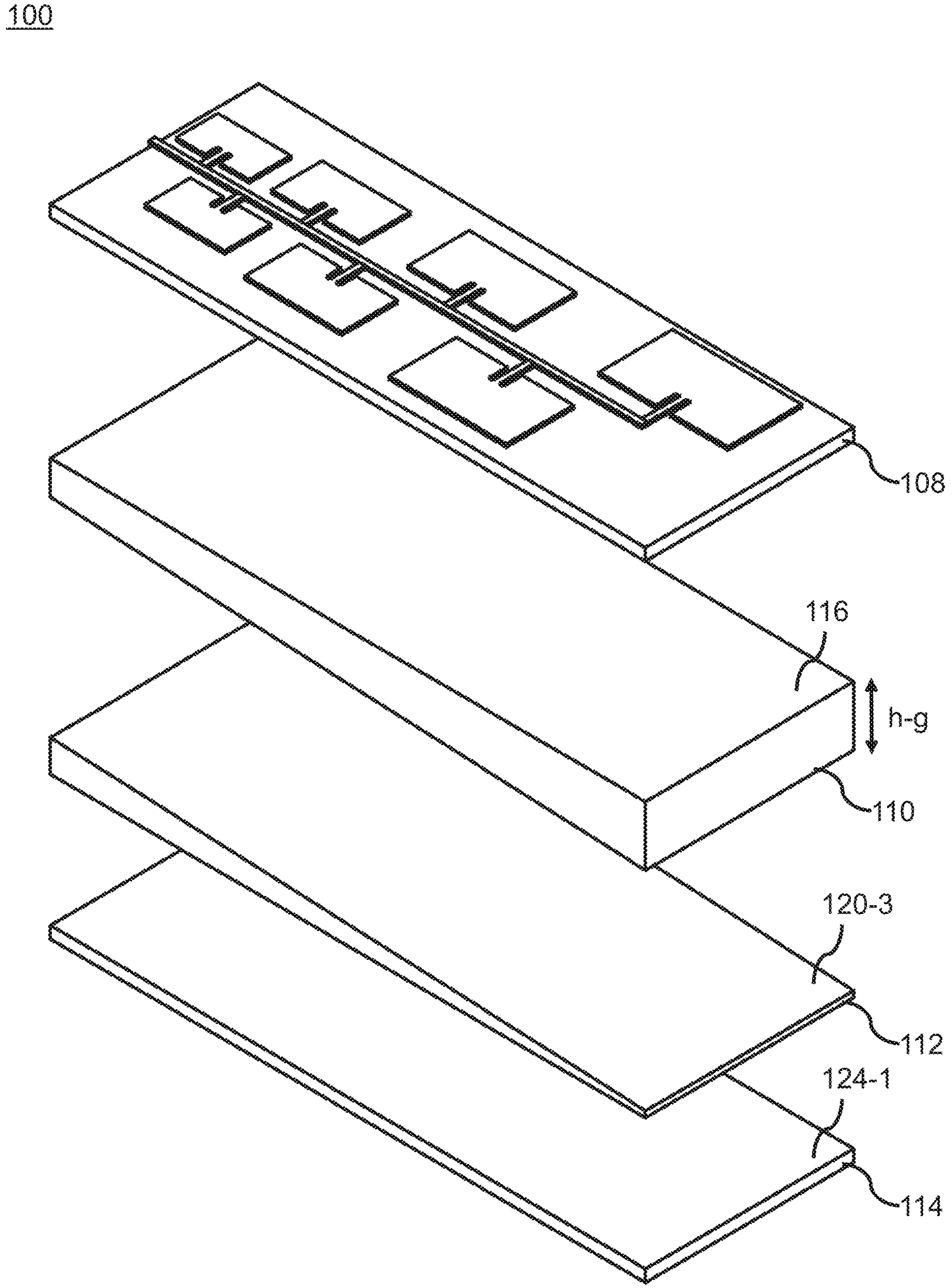
Figure 4D:
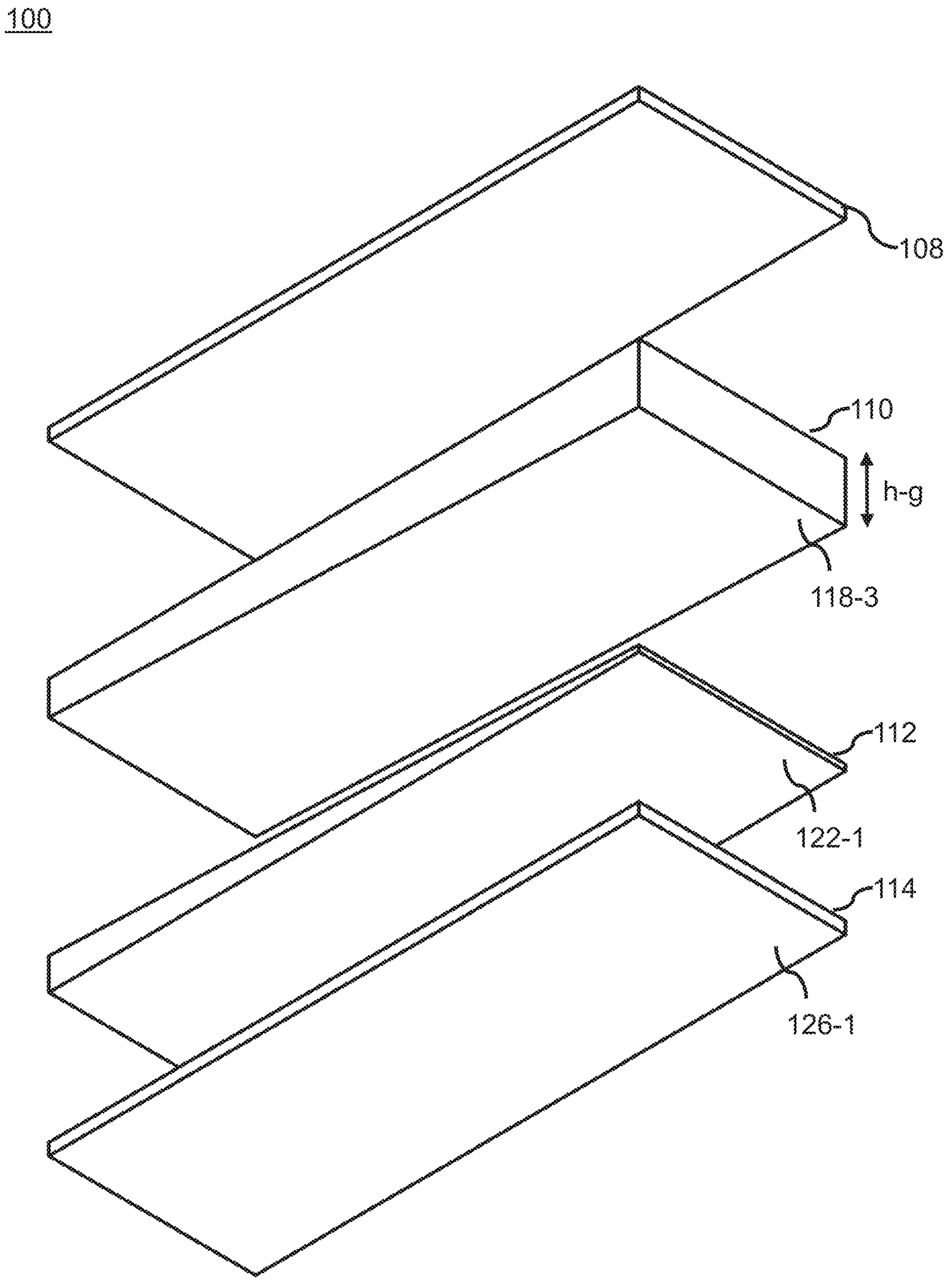
Figure 5A:
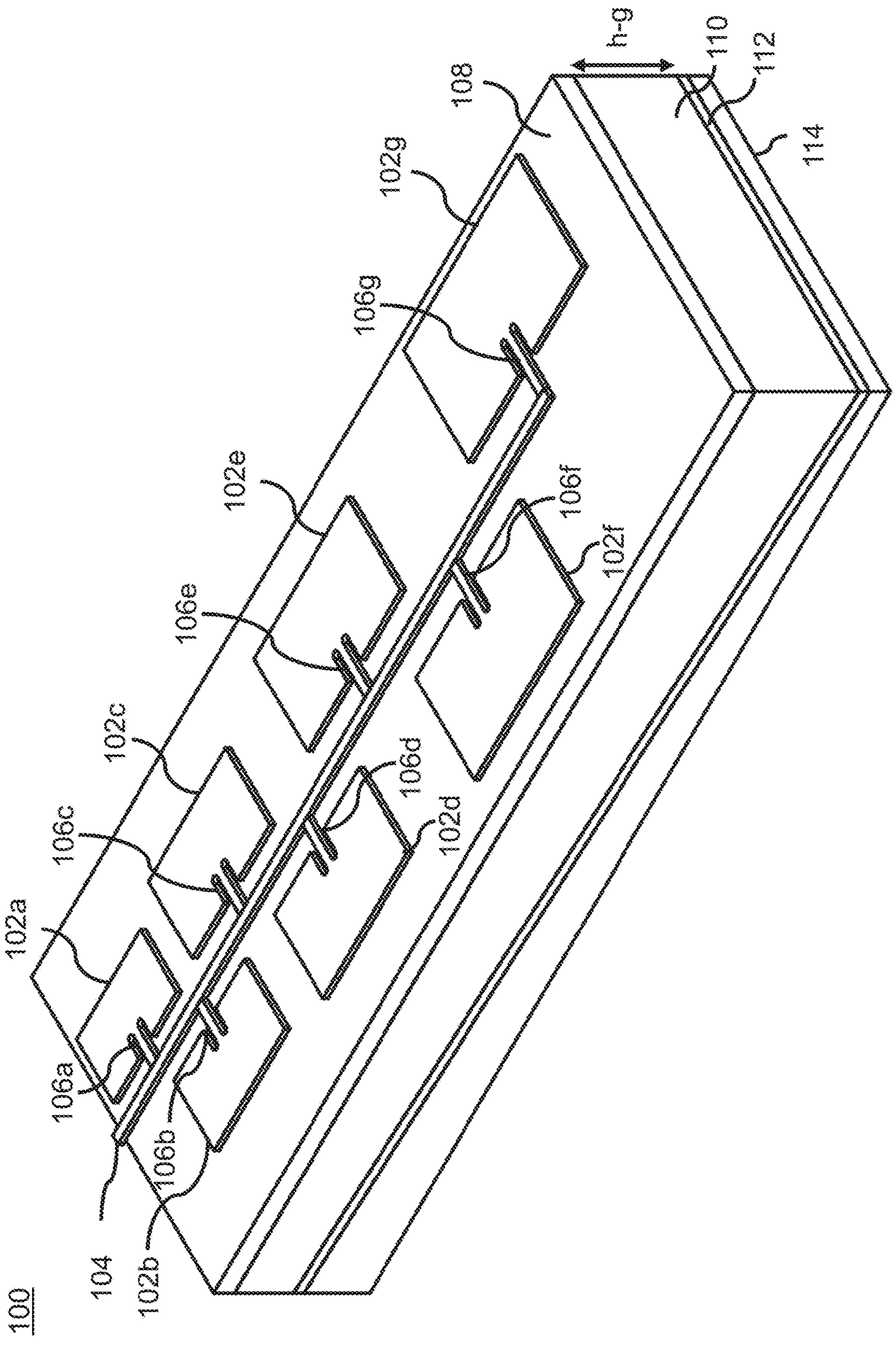
FIGS. 5A-5D depict a top-front perspective view, a top-rear perspective view, a top-front exploded view, and a bottom-front exploded view, respectively, of the MSPLPA, in accordance with one or more embodiments of the present disclosure.
Figure 5B:
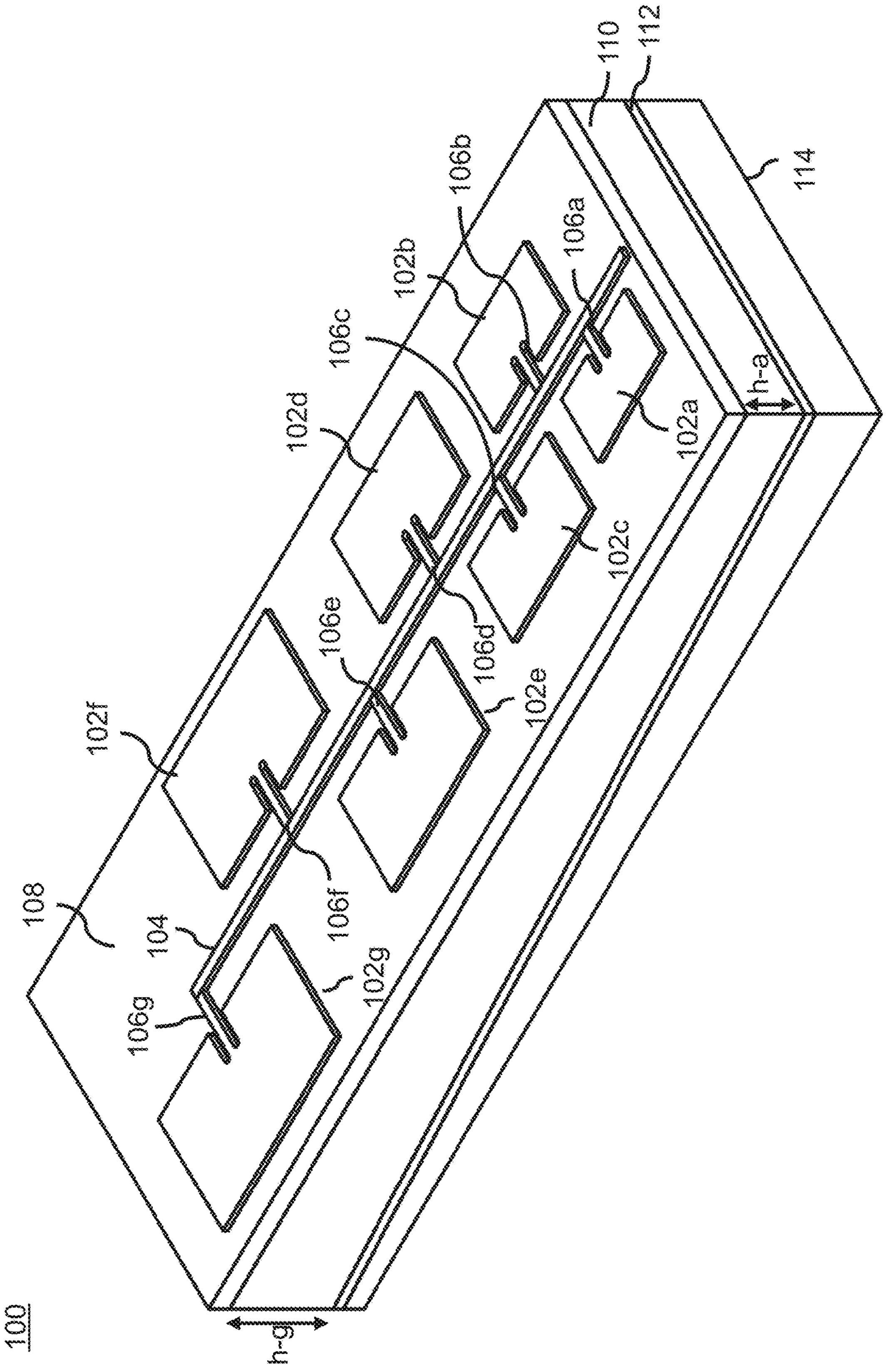
Figure 5C:
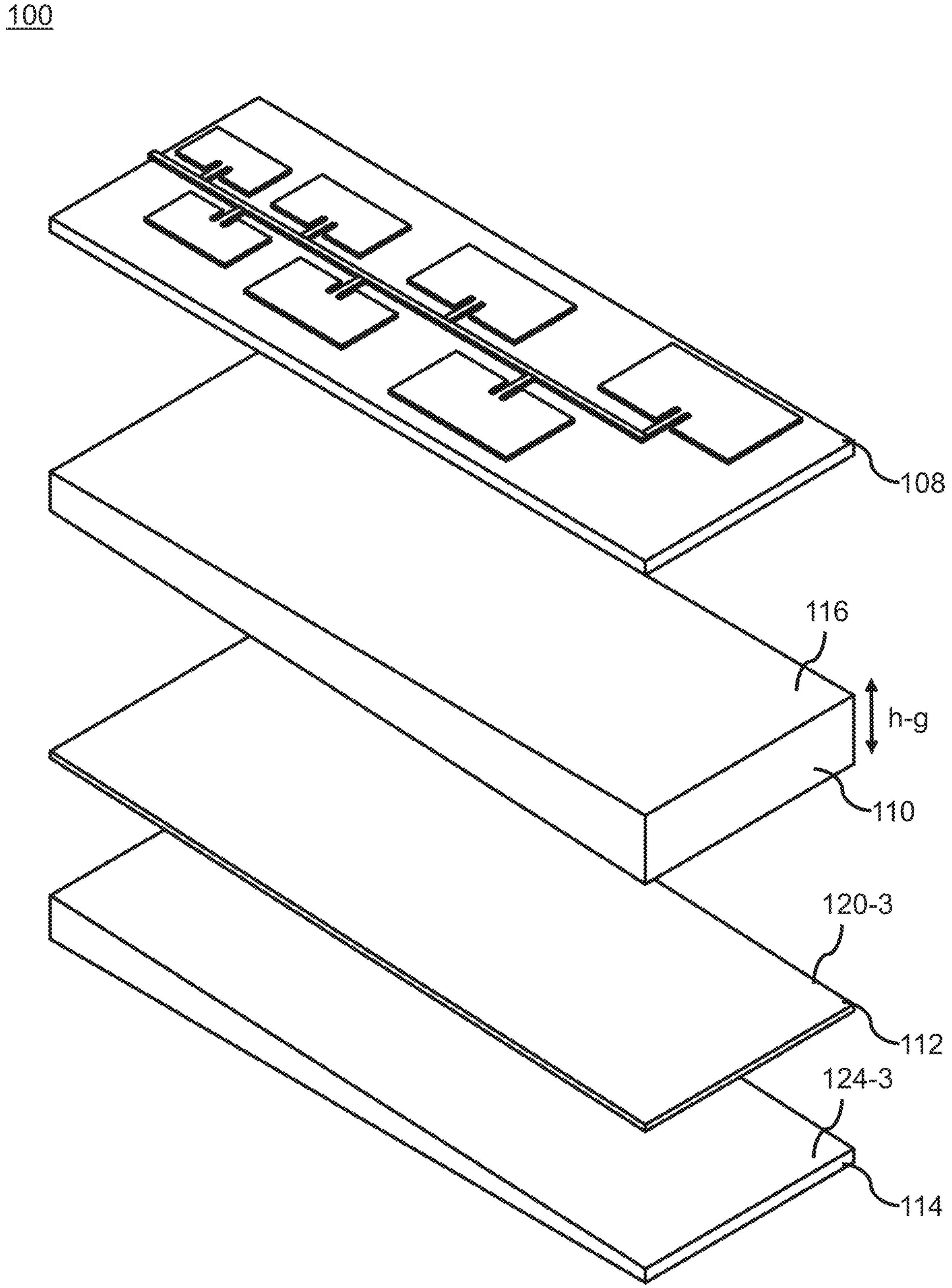
Figure 5D:
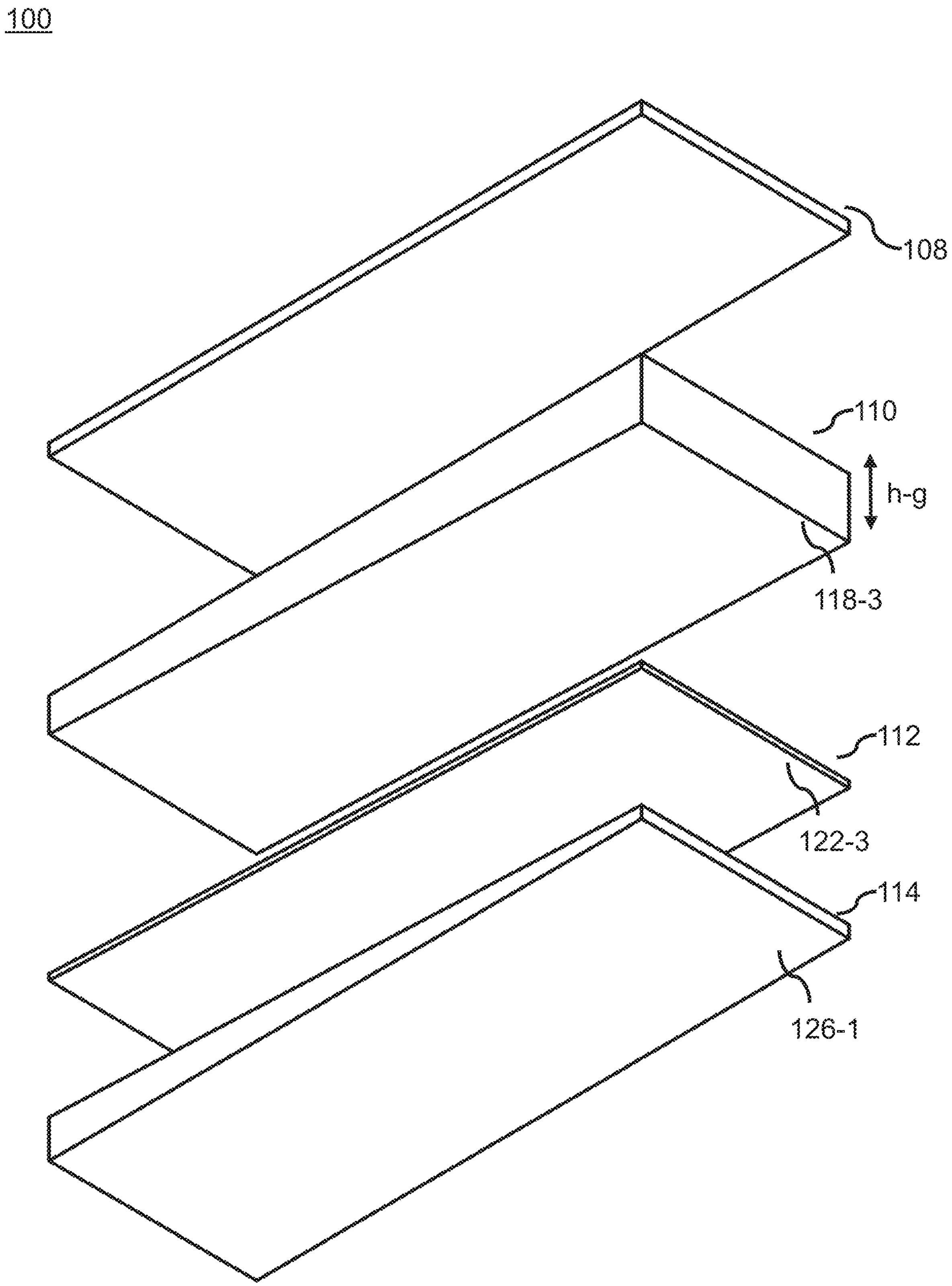
Figure 6A:
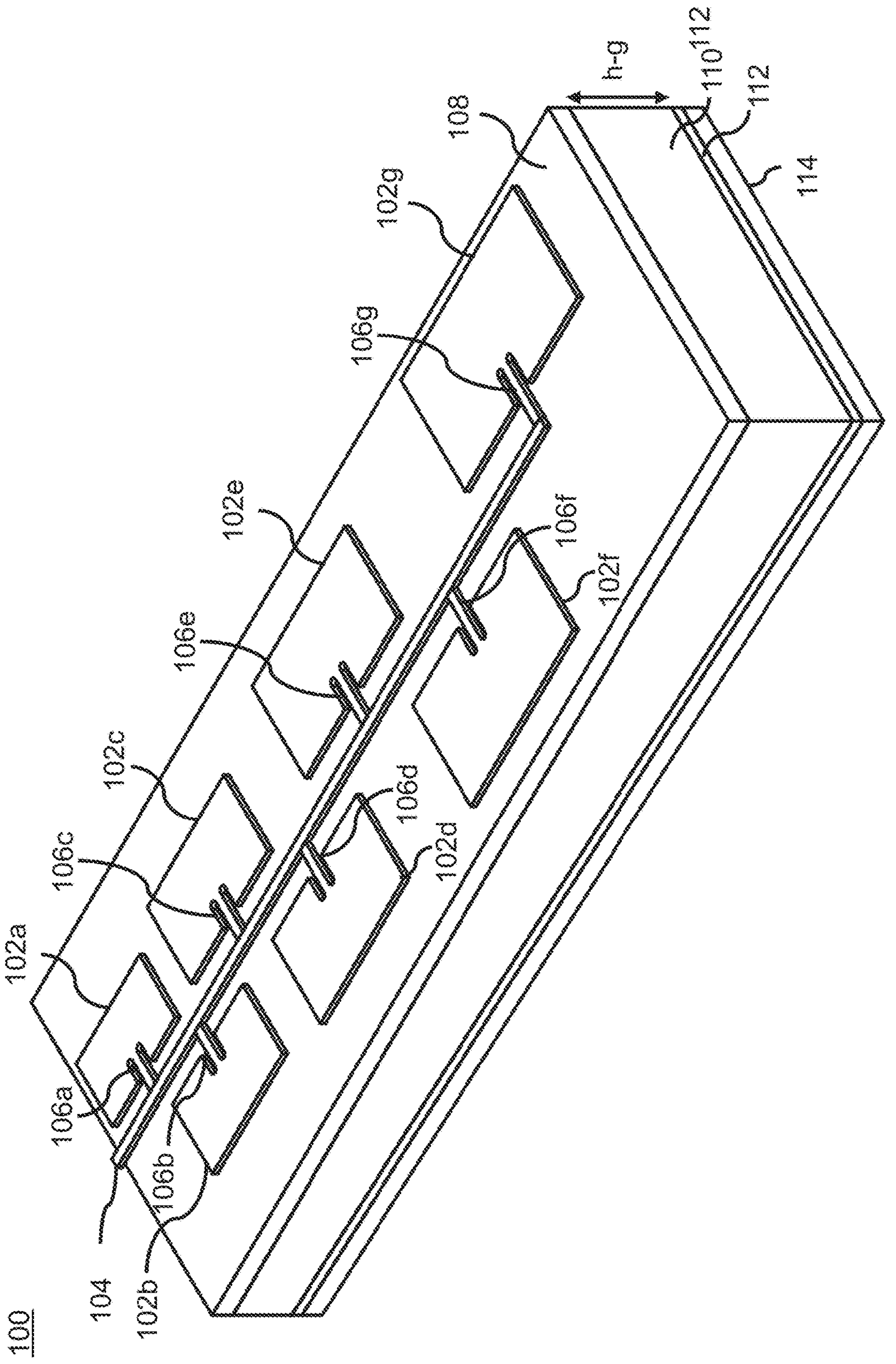
FIGS. 6A-6D depict a top-front perspective view, a top-rear perspective view, a top-front exploded view, and a bottom-front exploded view, respectively, of the MSPLPA, in accordance with one or more embodiments of the present disclosure.
Figure 6B:
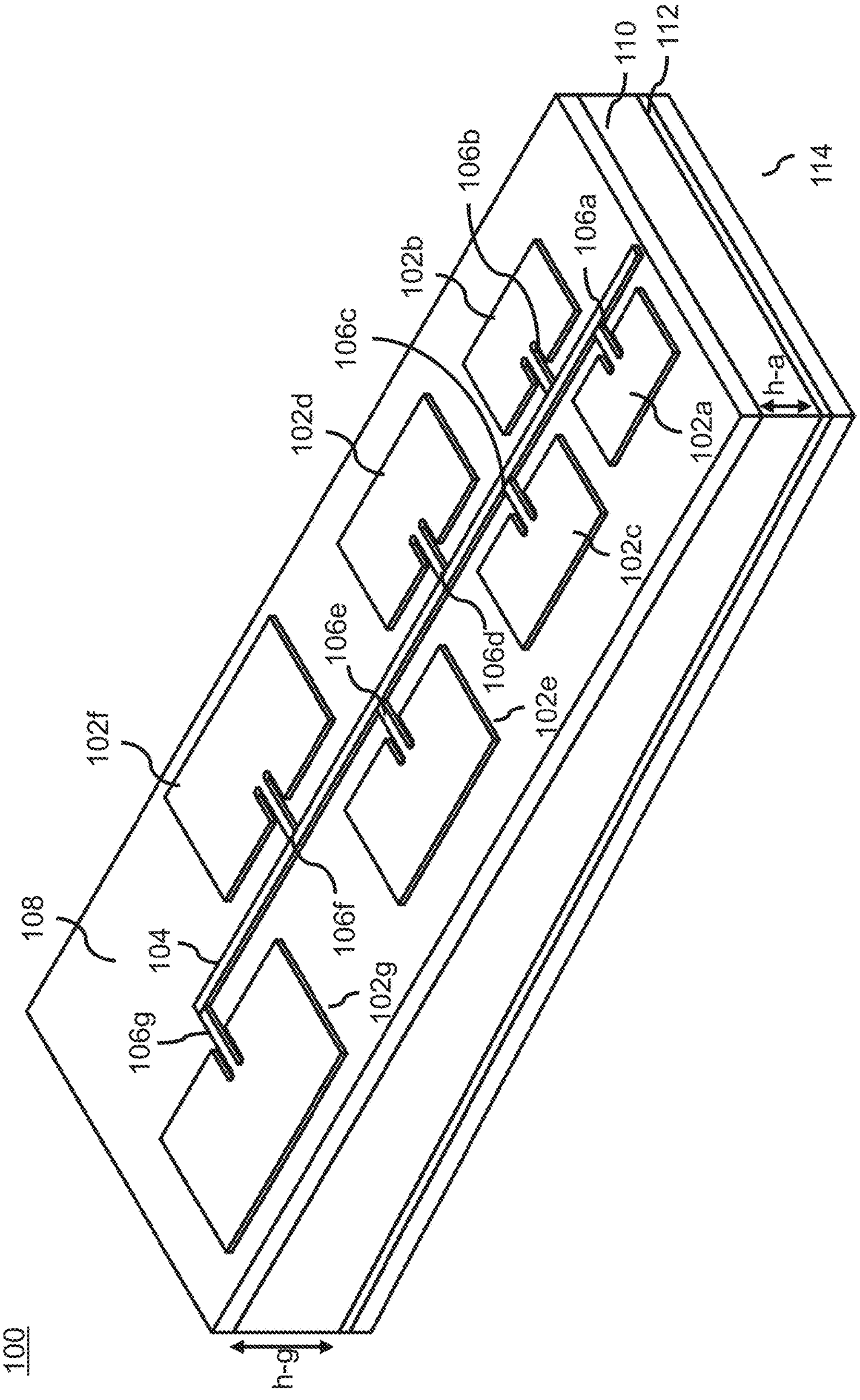
Figure 6C:
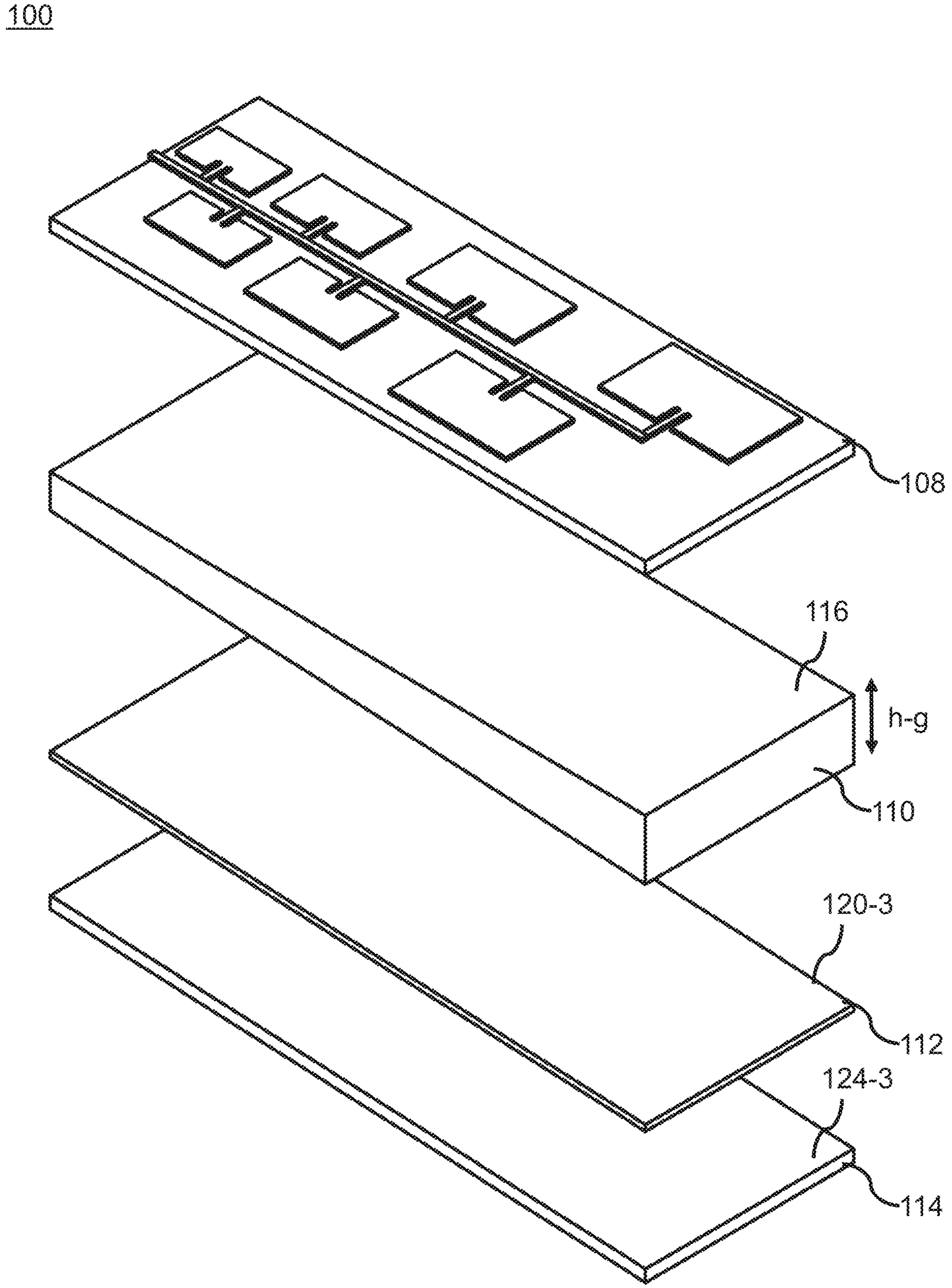
Figure 6D:
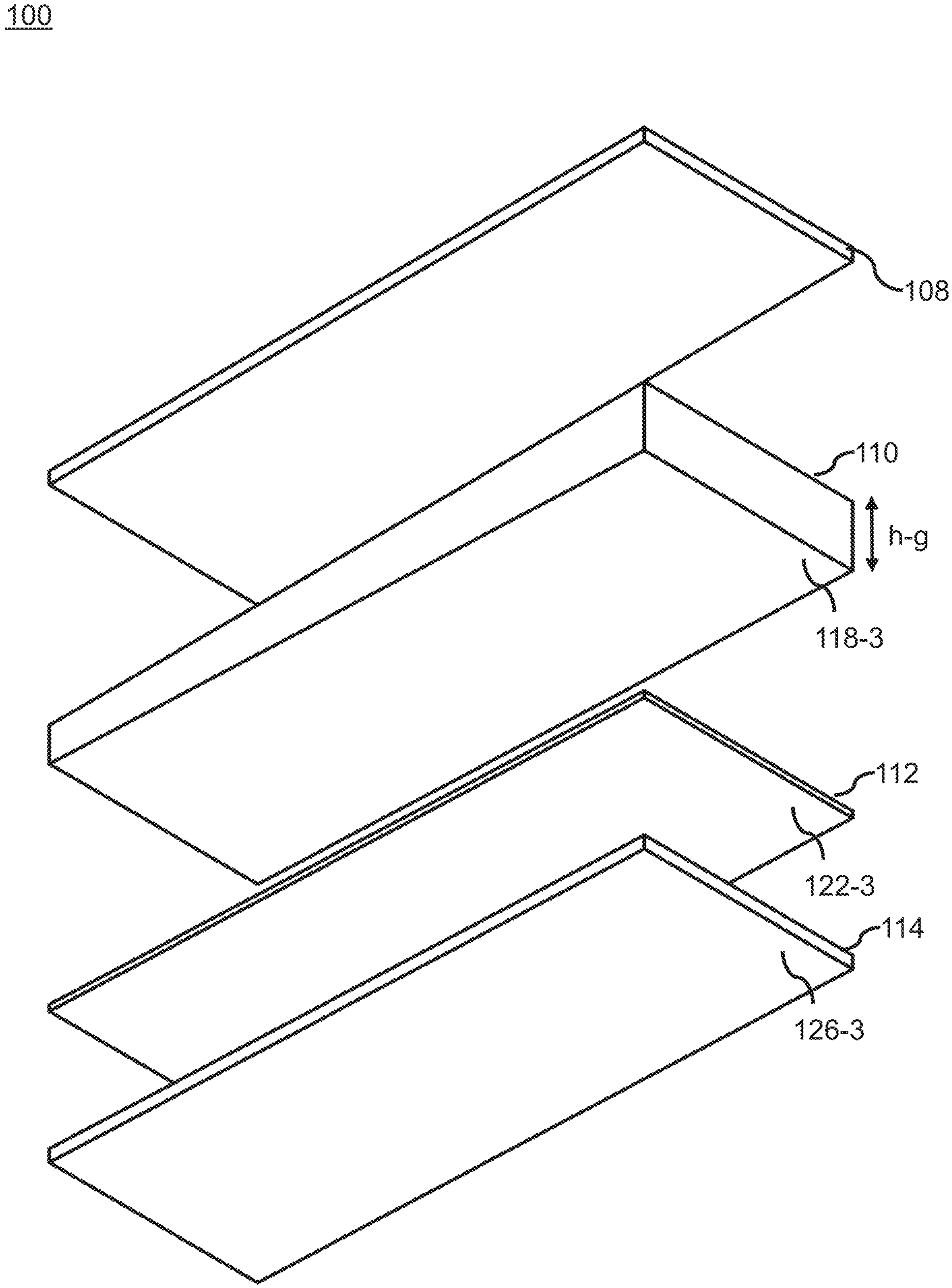
Figure 7A:
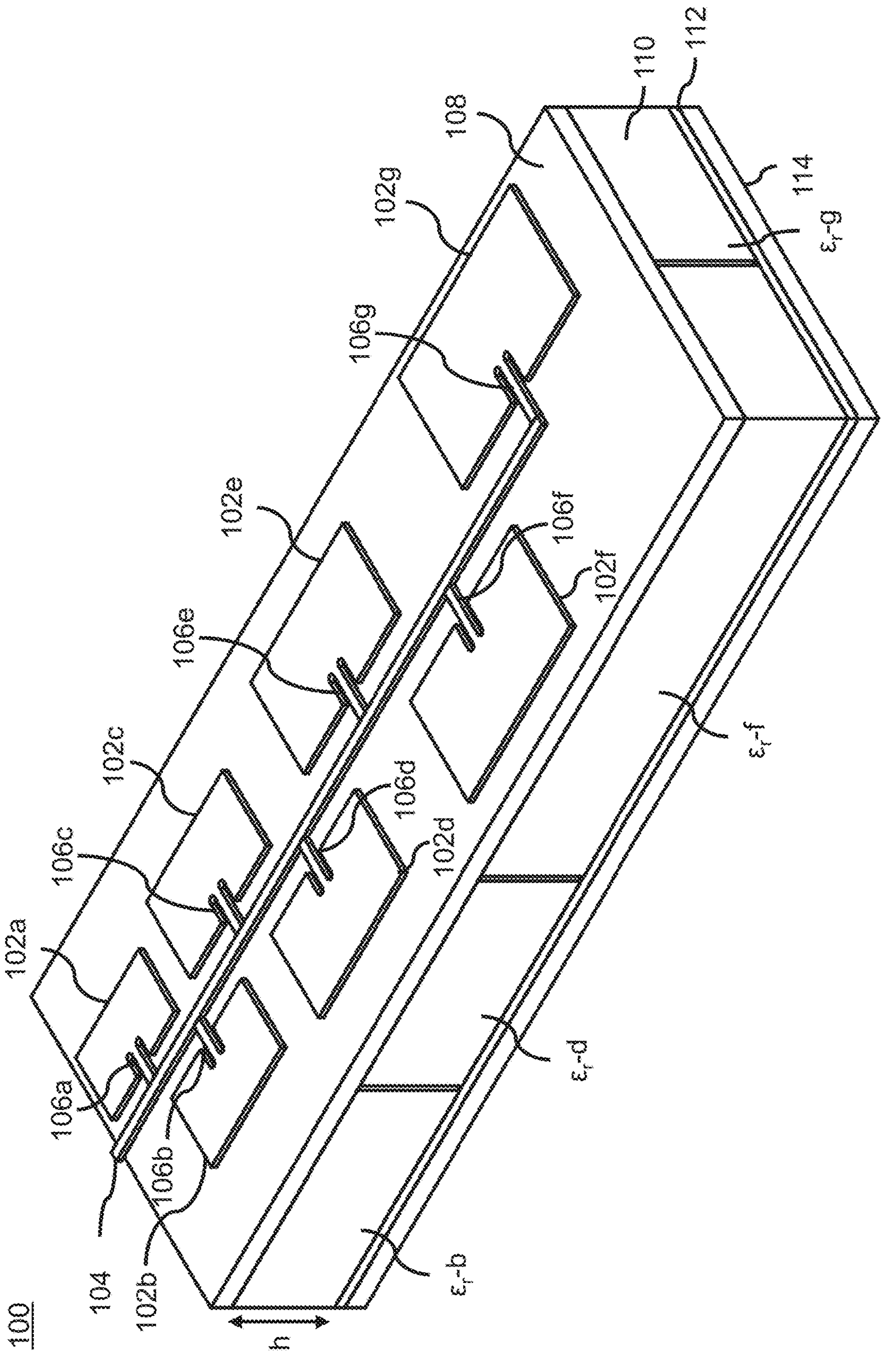
FIGS. 7A-7D depict a top-front perspective view, a top-rear perspective view, a top-front exploded view, and a bottom-front exploded view, respectively, of the MSPLPA, in accordance with one or more embodiments of the present disclosure.
Figure 7B:
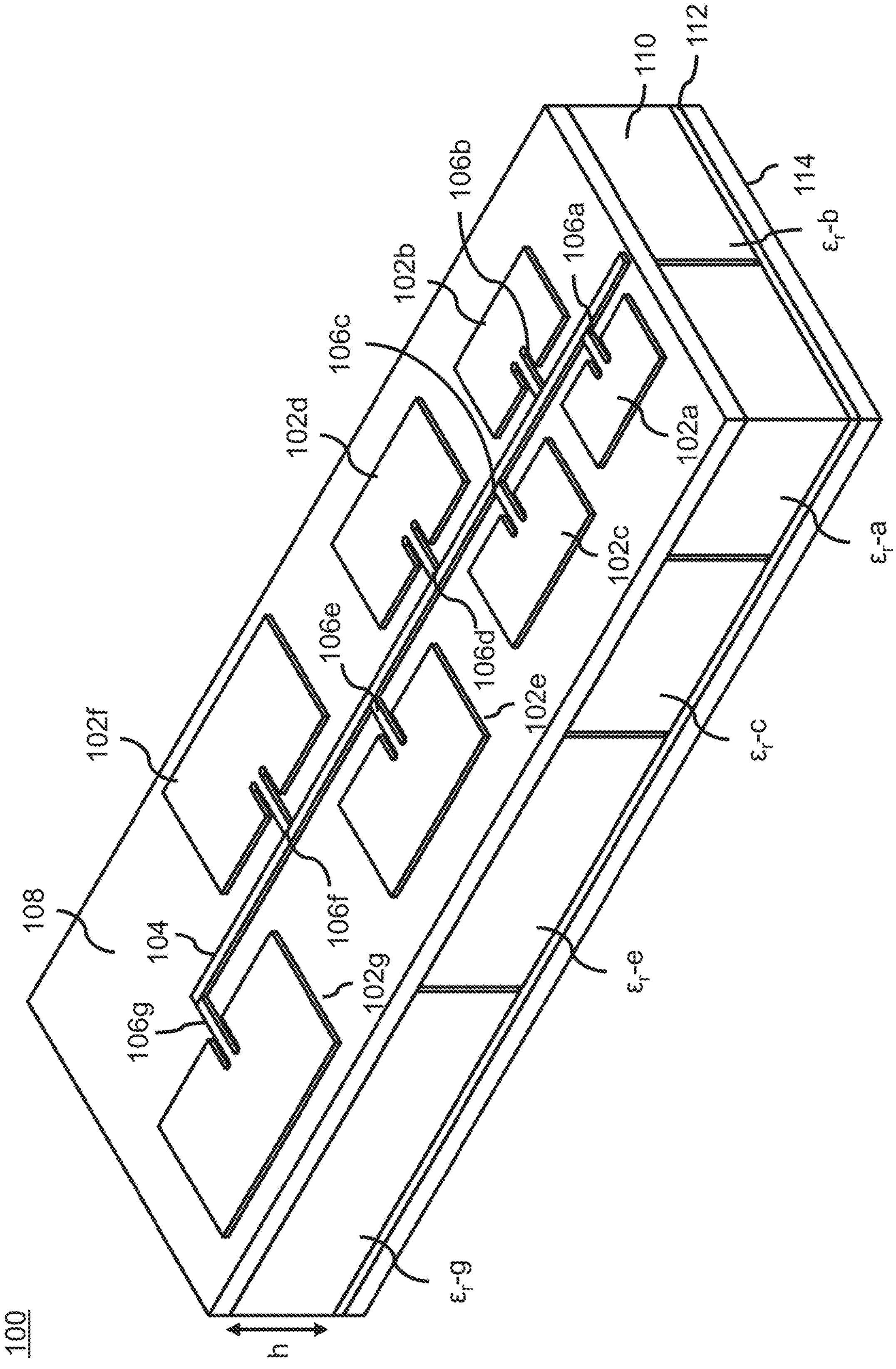
Figure 7C:
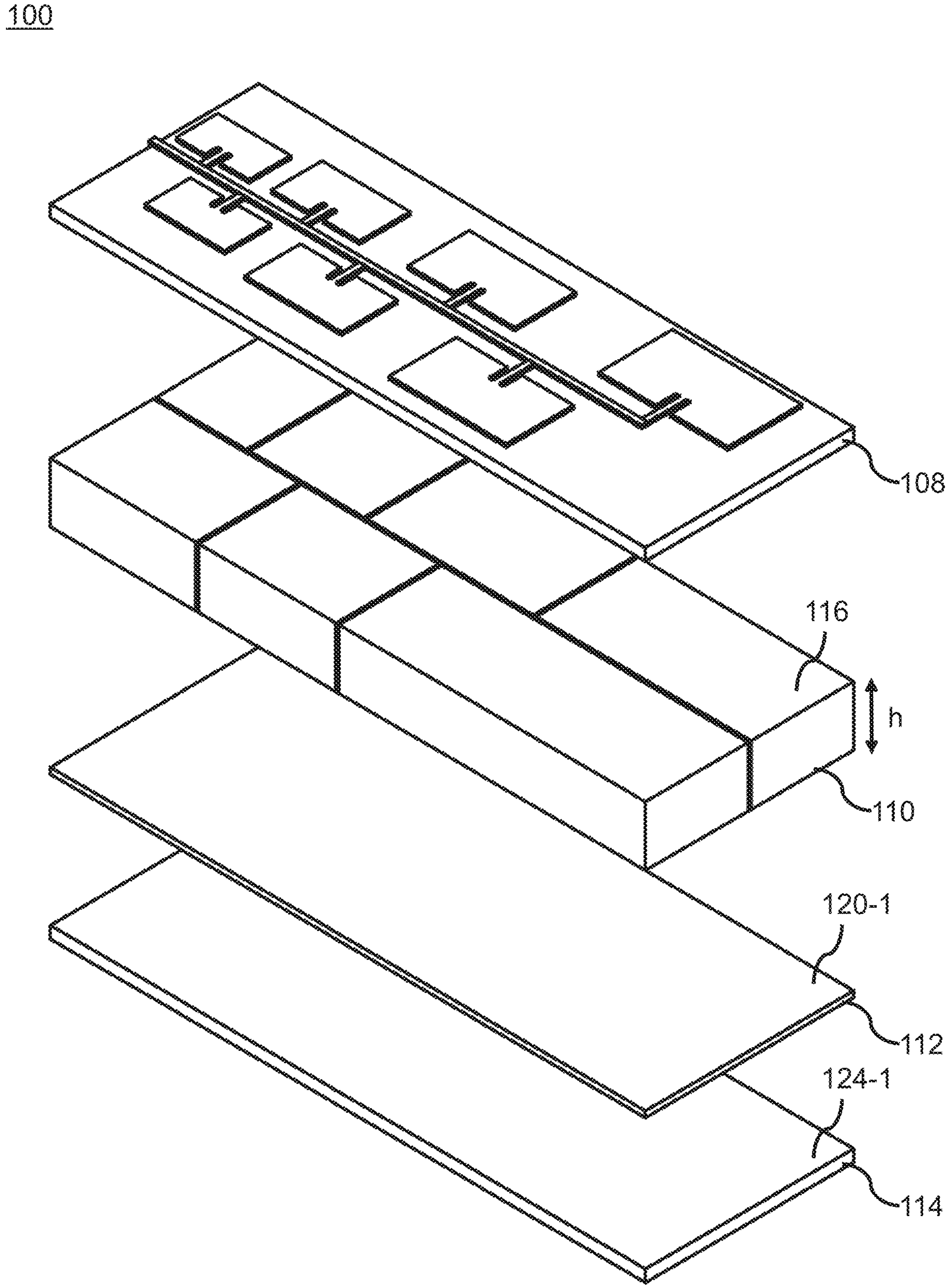
Figure 7D:
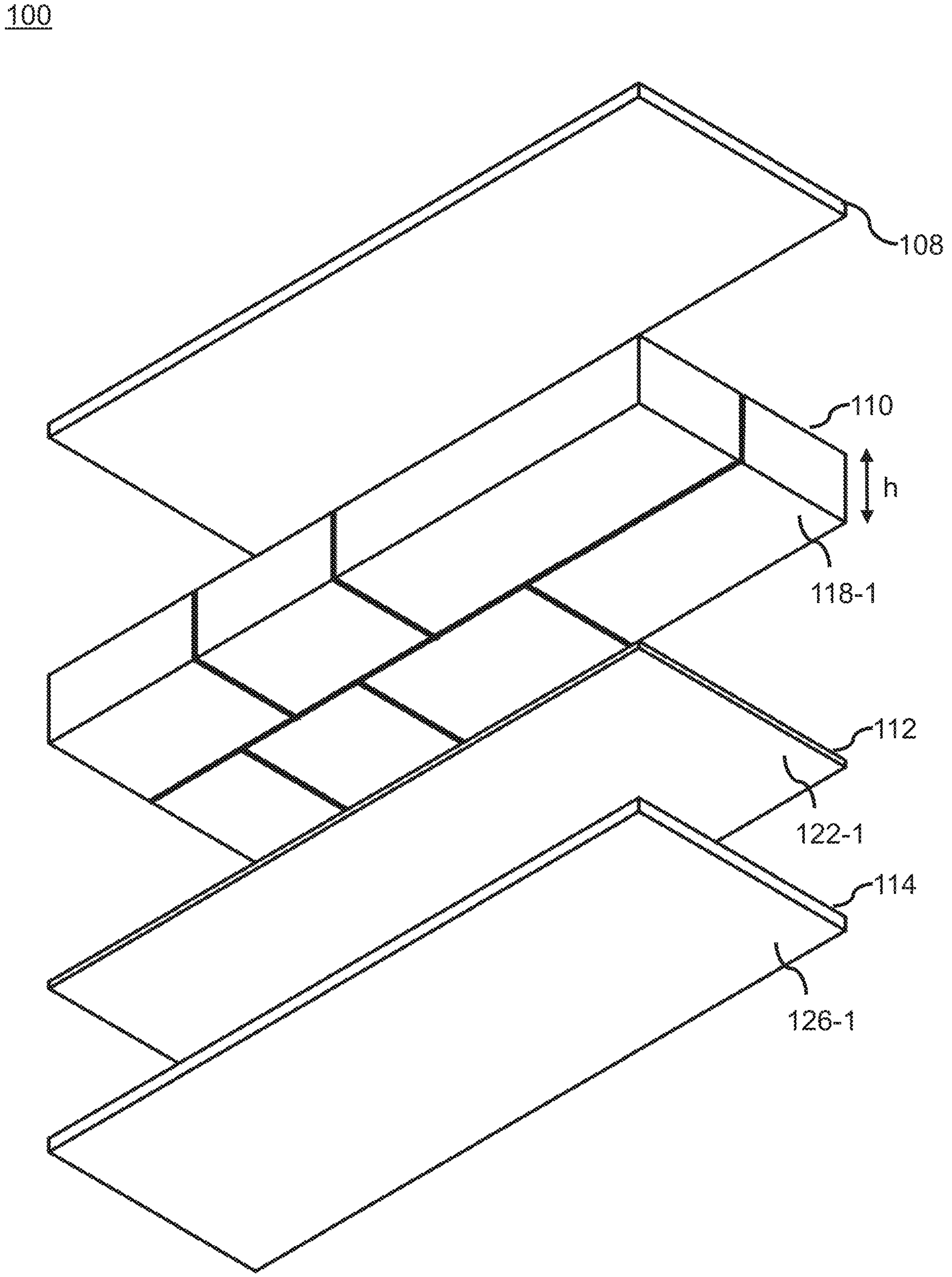

FIGS. 1A-7D depict a MSPLPA 100, in accordance with one or more embodiments of the present disclosure. The MSPLPA 100 may include patches 102, feed line 104, branch lines 106, printed circuit board 108 (PCB), scaled dielectric 110, ground plane 112, and/or a printed circuit board 114.

The patches 102 may be microstrip patches, patch elements, or the like.

The patches 102 may include a selected shape. For example, the patches 102 may be rectangular, square, circular, elliptical, triangular, disc sectors, ring sectors, or the like. As depicted, the patches 102 are rectangular, although this is not intended to be limiting. The patches 102 may be defined by one or more parameters. For a rectangular patch, the patches 102 may include a length (L) and a width (W). A size of the patches 102 may refer to the length (L), width (W), and/or area (e.g., L*W) of the patches 102. For the rectangular patch, the length (L) may be between one-third and one-half of the free-space wavelength (Ao) at which the rectangular patch is configured to transmit and/or receive.

The MSPLPA 100 may include a select number of the patches 102. For example, the MSPLPA 100 is depicted with seven of the patches 102 (e.g., patch 102*a* through patch 102*g*), although this is not intended as a limitation of the present disclosure. Patch 102*a* is the smallest of the patches 102 and patch 102*g* is a largest of the patches 102.

The feed line 104 may feed the patches 102. The patches 102 may be connected to the feed line 104 in parallel. Thus, the MSPLPA 100 may include one of the feed line 104.

The branch lines 106 may be connected between the feed line 104 and the patches 102. The patches 102 may be fed from the feed line 104 through the branch lines 106. Each of the patches 102 may be fed from the feed line 104 by a respective of the branch lines 106. Thus, the MSPLPA 100 may include a matching number of the patches 102 and the branch lines 106. For example, the MSPLPA 100 is depicted with seven of the branch lines 106 (e.g., branch line 106*a* through branch line 106*g*), although this is not intended as a limitation of the present disclosure.

The branch lines 106 may be separated from adjacent of the branch lines 106 by a separation distance (D).

The patches 102 may be connected to the feed line 104 with a 180-degree phase reversal between adjacent of the patches 102. Adjacent of the patches 102 may be disposed on alternating sides of the feed line 104. Similarly, adjacent of the branch lines 106 may be disposed on alternating sides of the feed line 104.

The patches 102 may be arranged in a log-periodic array. The log-periodic array may be periodic according to a scaling factor ($\tau$). The scaling factor ($\tau$) may be between 0 and 1. The lengths (L) of the patches 102, the widths (W) of the patches 102, the separation distance (D) between adjacent of the branch lines 106, and/or the length of branch lines 106 may increase logarithmically along the length of the MSPLPA 100 according to the scaling factor ($\tau$). The log-periodic array may include a structural geometry such that the impedance and radiation characteristics repeat periodically as the logarithm of the frequency.

The feed line 104 and/or the branch lines 106 may include a width which is less than the width (W) and/or length (L) of the patches 102. The feed line 104 and the branch lines 106 may or may not include the same width.

The patches 102, the feed line 104, and the branch lines 106 may each include a selected thickness. The thicknesses of the patches 102, the feed line 104, and the branch lines 106 may be uniform across the length and width of the MSPLPA 100.

The patches 102, the feed line 104, and the branch lines 106 may include a first electrically-conductive material, such as, but not limited to, copper, gold, or the like.

The branch lines 106 may couple to the patches 102 via an inset feed (I) with a gap (G). The inset feed (I) may be recessed from the patches 102 via the gap (G). The inset feed (I) and the gap (G) may provide impedance matching. The inset feed (I) and the gap (G) may maintain a select input impedance between the patches 102 and the feed line 104. The branch lines 106, the inset feed (I), and/or the gap (G), may scale along the length of the MSPLPA 100 to maintain the select input impedance. For example, an input impedance of 50 ohms may be maintained for each of the branch lines 106.

Although the branch lines 106 are depicted as coupling to the patches 102 via the inset feed (I) with the gap (G), this is not intended as a limitation of the present disclosure. It is contemplated that the branch lines 106 may couple to the patches 102 using any suitable feeding method, such as, but not limited to, the inset feed (I) with the gap (G), a proximity coupling (not depicted) between the patches 102 and the branch lines 106, or the like. The branch lines 106 may not contact the patches 102 where the branch lines 106 are proximity coupled to the patches 102. Rather, the branch lines 106 may be separated from the patches 102 by a dielectric. The feed lines 104 and the branch lines 106 may or may not be coplanar with the patches 102 where the branch lines 106 are proximity coupled to the patches 102.

The patches 102, the feed line 104, and/or the branch lines 106 may be disposed on the printed circuit board 108. For example, the patches 102, the feed line 104, and/or the branch lines 106 may be disposed on a top surface of the printed circuit board 108. The patches 102, the feed line 104, and/or the branch lines 106 may be disposed on the printed circuit board 108 by being printed on the top surface of the printed circuit board 108. The patches 102, the feed line 104, and/or the branch lines 106 may be printed on the printed circuit board 108 using any suitable technique, such as, but not limited to, photolithography.

The printed circuit board 108 may be referred to as a first printed circuit board.

The printed circuit board 108 may be a planar member. The printed circuit board 108 may be flat along a horizontal plane. The printed circuit board 108 may include a uniform thickness. The printed circuit board 108 may be thinner than wide or long. The printed circuit board 108 may not include any significant curvature along the horizontal plane.

The patches 102 may form a planar array where the printed circuit board 108 is flat along the horizontal plane. For example, the patches 102 may form a planar array disposed on the printed circuit board 108.

The printed circuit board 108 may be disposed on the scaled dielectric 110. The printed circuit board 108 may be disposed between the patches 102, the feed line 104, and/or the branch lines 106 and the scaled dielectric 110.

The scaled dielectric 110 may include a top surface 116 and a bottom surface 118.

The scaled dielectric 110 may be a planar member or a non-planar member. The scaled dielectric 110 may or may not be flat along a horizontal plane. The scaled dielectric 110 may include a height (h), also referred to as thickness. The height (h) of the scaled dielectric 110 may be defined between the top surface 116 and the bottom surface 118. The height (h) of the scaled dielectric 110 may or may not be constant along the length of the MSPLPA 100. The scaled dielectric 110 may be thinner than wide or long. The scaled dielectric 110 may or may not include any significant curvature along the horizontal plane.

The top surface 116 of the scaled dielectric 110 may be a horizontal top surface. The top surface 116 of the scaled dielectric 110 may about the printed circuit board 108.

The bottom surface 118 of the scaled dielectric 110 may abut the ground plane 112. The bottom surface 118 may be a horizontal bottom surface 118-1, stepped bottom surface 118-2, and/or wedged bottom surface 118-3.

The horizontal bottom surface 118-1 may be flat along the horizontal plane. The scaled dielectric 110 may be the planar member where the bottom surface 118 is the horizontal bottom surface 118-1. The scaled dielectric 110 may include a constant height (h) along the length of the MSPLPA 100 where the bottom surface 118 is the horizontal bottom surface 118-1.

The scaled dielectric 110 may be the non-planar member where the bottom surface 118 is the stepped bottom surface 118-2 or the wedged bottom surface 118-3. The scaled dielectric 110 may include a non-constant height (h) along the length of the MSPLPA 100 where the bottom surface 118 is the stepped bottom surface 118-2 and/or the wedged bottom surface 118-3. Where the height is non-constant, a smallest height (h) (e.g., h–a) of the scaled dielectric 110 may be disposed below a smallest of the patches 102 (e.g., patch 102*a*) and a largest height (h) (e.g., h–g) of the scaled dielectric 110 may be disposed below a largest of the patches 102 (e.g., patch 102*g*).

Steps of the stepped bottom surface 118-2 may be disposed below a respective of the patches 102. Thus, the stepped bottom surface 118-2 may include at least as many of the steps as the patches 102. For example, the stepped bottom surface 118-2 is depicted as including seven of the steps, although this is not intended to be limiting. It is further contemplated that the stepped bottom surface 118-2 may include more of the steps than the patches 102.

The stepped bottom surface 118-2 may define the height (h) of the scaled dielectric 110. The steps of the stepped bottom surface 118-2 may increase according to the scaling factor ($\tau$) along the length of the MSPLPA 100. A shortest step of the stepped bottom surface 118-2 may be disposed below a smallest of the patches 102 (e.g., patch 102*a*) and/or a highest frequency region of the MSPLPA 100. A tallest step of the stepped bottom surface 118-2 may be disposed below a largest of the patches 102 (e.g., patch 102*g*) and/or a lowest frequency region of the MSPLPA 100. The steps of the stepped bottom surface 118-2 may increase according to the scaling factor ($\tau$) between the shortest step and the tallest step of the stepped bottom surface 118-2. The height of the steps (e.g., the shortest step, the tallest step) of the stepped bottom surface 118-2 may refer to the height (h).

The stepped bottom surface 118-2 may include alternate stepping. The alternate stepping may also be referred to as alternate-tread, double-riser, or the like. The stepped bottom surface 118-2 may include the alternate stepping to match the arrangement of the patches 102 in the log-periodic array on alternating sides of the feed line 104. For example, adjacent of the steps of the stepped bottom surface 118-2 may be disposed on alternating sides of the feed line 104 below respective of the adjacent of the patches 102 which are also disposed on alternating sides of the feed line 104.

The wedged bottom surface 118-3 may be set at an incline to the patches 102. The angle of the incline may be based on the scaling factor ($\tau$). A height of the wedged bottom surface 118-3 may define the height (h) of the scaled dielectric 110. The height of the wedged bottom surface 118-3 may increase according to the scaling factor ($\tau$) along the length of the MSPLPA 100. A shortest portion of the wedged bottom surface 118-3 may be disposed below a smallest of the patches 102 (e.g., patch 102*a*) and a tallest portion of the wedged bottom surface 118-3 may be disposed below a largest of the patches 102 (e.g., patch 102*g*). The height of the wedged bottom surface 118-3 may increase according to the scaling factor ($\tau$) between the shortest portion and the tallest portion of the wedged bottom surface 118-3.

The scaled dielectric 110 may be disposed on the ground plane 112. The scaled dielectric 110 may be disposed between the printed circuit board 108 and the ground plane 112. Similarly, the scaled dielectric 110 may be disposed between the patches 102 and the ground plane 112.

The ground plane 112 may include a second electrically-conductive material, such as, but not limited to, copper, gold, or the like. The second electrically-conductive material may or may not be the same as the first electrically-conductive material from which the patches 102, the feed line 104, and/or the branch lines 106 are made.

The patches 102 may capacitively couple to the ground plane 112 through the printed circuit board 108 and/or the scaled dielectric 110.

The ground plane 112 may be a planar member or a non-planar member. The ground plane 112 may or may not be flat along a horizontal plane. The ground plane 112 may or may not include a uniform thickness. The ground plane 112 may be thinner than wide or long. The ground plane 112 may or may not include any significant curvature along the horizontal plane.

The ground plane 112 may include a top surface 120 and a bottom surface 122. The thickness of the ground plane 112 may be defined between the top surface 120 and the bottom surface 122.

The top surface 120 of the ground plane 112 may abut the scaled dielectric 110. The top surface 120 of the ground plane 112 may conform to the bottom surface 118 of the scaled dielectric 110. For example, the top surface 120 of the ground plane 112 may conform to the horizontal bottom surface 118-1, the stepped bottom surface 118-2, and/or the wedged bottom surface 118-3. The top surface 120 may be a horizontal top surface 120-1, a stepped top surface 120-2, and/or a wedged top surface 120-3. The horizontal top surface 120-1, the stepped top surface 120-2, and the wedged top surface 120-3 may conform the horizontal bottom surface 118-1, the stepped bottom surface 118-2, and the wedged bottom surface 118-3, respectively.

The horizontal top surface 120-1 may be flat along the horizontal plane. The patches 102 may be set at a constant distance from the ground plane 112 where the top surface 120 is the horizontal top surface 120-1.

The stepped top surface 120-2 may be aligned with the stepped top surface 120-2.

The wedged top surface 120-3 may be set at an incline to the patches 102. The wedged top surface 120-3 may be aligned with the wedged bottom surface 118-3.

The bottom surface 122 of the ground plane 112 may abut the printed circuit board 114. The bottom surface 122 may be a horizontal bottom surface 122-1, a stepped bottom surface 122-2, or a wedged bottom surface 122-3.

The horizontal bottom surface 122-1 may be flat along the horizontal plane.

The stepped bottom surface 122-2 may be aligned with the stepped top surface 120-2. The ground plane 112 may include a uniform thickness between the stepped top surface 120-2 and the stepped bottom surface 122-2.

The wedged bottom surface 122-3 may be set at an incline to the patches 102. The wedged bottom surface 122-3 may be aligned with the wedged bottom surface 118-3 and/or the wedged top surface 120-3.

It is contemplated that the ground plane 112 may include several permutations of the horizontal top surface 120-1, the stepped top surface 120-2, and/or the wedged top surface 120-3 in combination with the horizontal bottom surface 122-1, the stepped bottom surface 122-2, and/or the wedged bottom surface 122-3. For example, the ground plane 112 may include the horizontal top surface 120-1 and the horizontal bottom surface 122-1. By way of another example, the ground plane 112 may include the stepped top surface 120-2 and the horizontal bottom surface 122-1. By way of another example, the ground plane 112 may include the stepped top surface 120-2 and the stepped bottom surface 122-2. By way of another example, the ground plane 112 may include the wedged top surface 120-3 and the horizontal bottom surface 122-1. By way of another example, the ground plane 112 may include the wedged top surface 120-3 and the wedged bottom surface 122-3.

The ground plane 112 may be the planar member where the top surface 120 is the horizontal top surface 120-1 and the bottom surface 122 is the horizontal bottom surface 122-1. The ground plane 112 may also be the planar member where the top surface 120 is the wedged top surface 120-3 and the bottom surface 122 is the wedged bottom surface 122-3, although the planar member may be aligned with inclined plane and not be aligned in the horizontal plane. A thickness of ground plane 112 may be uniform where the ground plane 112 is the planar member.

The ground plane 112 may be the non-planar member when any of the following are true: the top surface 120 is the stepped top surface 120-2; the bottom surface 122 is the stepped bottom surface 122-2; or the top surface 120 is the wedged top surface 120-3 and the bottom surface 122 being the horizontal bottom surface 122-1. A thickness of ground plane 112 may be non-uniform where the ground plane 112 is the non-planar member.

The ground plane 112 may be disposed on the printed circuit board 114. The ground plane 112 may be disposed between the scaled dielectric 110 and the printed circuit board 114. The ground plane 112 may be disposed on the top surface 124 of the printed circuit board 114. The ground plane 112 may be disposed on the printed circuit board 114 by being printed on the top surface 124 of the printed circuit board 114. The ground plane 112 may be printed on the printed circuit board 114 using any suitable technique, such as, but not limited to, photolithography.

The printed circuit board 114 may be referred to as a second printed circuit board.

The printed circuit board 114 may be a bottom-most component of the MSPLPA 100. The printed circuit board 114 may support the ground plane 112.

The printed circuit board 114 may be a planar member or a non-planar member. The printed circuit board 114 may or may not be flat along a horizontal plane. The printed circuit board 114 may or may not include a uniform thickness. The printed circuit board 114 may be thinner than wide or long. The printed circuit board 114 may or may not include any significant curvature along the horizontal plane.

The printed circuit board 114 may include a top surface 124 and/or a bottom surface 126.

The top surface 124 of the printed circuit board 114 may abut the ground plane 112. The top surface 124 of the printed circuit board 114 may conform to the bottom surface 122 of the ground plane 112. For example, the top surface 124 of the printed circuit board 114 may conform to the horizontal bottom surface 122-1, the stepped bottom surface 122-2, and/or the wedged bottom surface 122-3. The top surface 124 may be a horizontal top surface 124-1, a stepped top surface 124-2, and/or a wedged top surface 124-3. The horizontal top surface 124-1, the stepped top surface 124-2, and the wedged top surface 124-3 may conform the horizontal bottom surface 122-1, the stepped bottom surface 122-2, and the wedged bottom surface 122-3, respectively.

The horizontal top surface 124-1 may be flat along the horizontal plane. The patches 102 may be set at a uniform distance from the printed circuit board 114 where the top surface 124 is the horizontal top surface 124-1.

The stepped top surface 124-2 may be aligned with the stepped bottom surface 122-2.

The wedged top surface 124-3 may be set at an incline to the patches 102. The wedged top surface 124-3 may be aligned with the wedged bottom surface 118-3, the wedged top surface 120-3, and/or the wedged bottom surface 122-3.

The bottom surface 126 of the printed circuit board 114 may be a bottom-surface of the MSPLPA 100. The bottom surface 126 may be a horizontal bottom surface 126-1 or a wedged bottom surface 126-3.

The horizontal bottom surface 126-1 may be flat along the horizontal plane. The MSPLPA 100 may include a constant thickness across the length of the MSPLPA 100 where the bottom surface 126 is the horizontal bottom surface 126-1. The thickness of the MSPLPA 100 may refer to the thickness from the top of the patches 102 to the bottom surface 126 of the printed circuit board 114.

The wedged bottom surface 126-3 may be set at an incline to the patches 102. The wedged bottom surface 122-3 may be aligned with the wedged bottom surface 118-3, the wedged top surface 120-3, the wedged bottom surface 122-3, and/or wedged top surface 124-3. The MSPLPA 100 may include a non-constant thickness across the length of the MSPLPA 100 where the bottom surface 126 is the wedged bottom surface 126-3. The wedged bottom surface 126-3 may be beneficial for assembling the MSPLPA 100 within an assembly which is constrained for space, such as, but not limited to, aircraft, air-launched effects, and the like.

The printed circuit board 114 may include several permutations of the horizontal top surface 124-1, the stepped top surface 124-2, and/or the wedged top surface 124-3 in combination with the horizontal bottom surface 126-1 and/or the wedged bottom surface 126-3. For example, the printed circuit board 114 may include the horizontal top surface 124-1 and the horizontal bottom surface 126-1. By way of another example, the printed circuit board 114 may include the stepped top surface 124-2 and the horizontal bottom surface 126-1. By way of another example, the printed circuit board 114 may include the wedged top surface 124-3 and the horizontal bottom surface 126-1. By way of another example, the printed circuit board 114 may include the wedged top surface 124-3 and the wedged bottom surface 126-3.

The printed circuit board 114 may be the planar member where the top surface 124 is the horizontal top surface 124-1 and the bottom surface 126 is the horizontal bottom surface 126-1. The printed circuit board 114 may also be the planar member where the top surface 124 is the wedged top surface 124-3 and the bottom surface 126 is the wedged bottom surface 126-3, although the planar member may be aligned with inclined plane and not be aligned in the horizontal plane. A thickness of printed circuit board 114 may be uniform where the printed circuit board 114 is the planar member.

The printed circuit board 114 may be the non-planar member when any of the following are true: the top surface 124 is the stepped top surface 124-2; or the top surface 124 is the wedged top surface 124-3 and the bottom surface 126 is the horizontal bottom surface 126-1. A thickness of printed circuit board 114 may be non-uniform where the printed circuit board 114 is the non-planar member.

The printed circuit board 108, the scaled dielectric 110, and/or the printed circuit board 114 may include one or more material, such as, but not limited to, silicon, glass, quartz, resin, or the like. The resin may be a ceramic-filled, UV-curable resin. The printed circuit board 108, the scaled dielectric 110, and/or the printed circuit board 114 may or may not include the same material.

The scaled dielectric 110 may include a relative dielectric constant ($\varepsilon_r$). The relative dielectric constant ($\varepsilon_r$) may also be referred to as relative permittivity. The relative dielectric constant ($\varepsilon_r$) may be greater than 1.

The relative dielectric constant ($\varepsilon_r$) may be based on a material from which the scaled dielectric 110 is made and/or a fill factor of the material from which the scaled dielectric 110 is made. The fill factor may refer to the ratio of the volume of the material in the scaled dielectric 110 to the total volume of the scaled dielectric 110. The fill factor may be between 0 and 1. The volume of the scaled dielectric 110 which is not filled by the material may be filled by vacuum, air, or the like. The relative dielectric constant ($\varepsilon_r$) may be proportional to the fill factor.

The scaled dielectric 110 may include an effective dielectric constant (Sett). The effective dielectric constant ($\varepsilon_{reff}$) of the scaled dielectric 110 may be dependent on the relative dielectric constant ($\varepsilon_r$) of the scaled dielectric 110, the height (h) of the scaled dielectric 110, and the width (W) of the patches 102. The effective dielectric constant ($\varepsilon_{reff}$) may be proportional to the relative dielectric constant ($\varepsilon_r$) of the scaled dielectric 110, inversely proportional to the height (h) of the scaled dielectric 110, and/or proportional to the width (W) of the patches 102. For example, the effective dielectric constant ($\varepsilon_{reff}$) may be approximated by the following equation:

$$\epsilon_{reff} = \frac{\epsilon_r + 1}{2} + \frac{\epsilon_r - 1}{2}\left[1 + 12\frac{h}{w}\right]^{-1/2}$$

The effective dielectric constant (Sett) may change an effective length (Lert) of the patches 102. The effective length (Lert) of the patches 102 may control the frequencies and wavelengths at which the patches 102 are configured to transmit. For example, the effective length (Left) of the patches 102 may be a half-wavelength at which the patches 102 may transmit and receive. The effective length (Left) of the patches 102 may be approximated by the following equations:

$$\Delta L = 0.412h\frac{\varepsilon_{reff} + 0.3}{\varepsilon_{reff} - 0.258}\frac{\left(\frac{w}{h} + 0.264\right)}{\left(\frac{w}{h} + 0.8\right)}$$

$$L_{eff} = L + 2\Delta L$$

The patches 102 may be configured to transmit and/or receive radio frequency signals. The feed line 104 may connect the patches 102 to a transmit/receive (TR) module (not depicted), a software defined radio (not depicted), or the like, by which the patches 102 may be configured to transmit and/or receive the radio frequency signals.

The patches 102 may be configured to transmit and/or receive radio frequency signals in the very high frequency (VHF) band between 30 and 300 MHz (e.g., between 100 and 300 MHz of the VHF band), in the ultra high frequency (UHF) band between 300 MHz and 3 GHz, and/or in the super high frequency (SHF) band between 3 and 30 GHz. For example, the patches 102 may be configured to transmit and/or receive radio frequency signals with a minimum return loss between 2.38 GHz and 5.15 GHz, although this is not intended to be limiting. The minimum return loss may also be referred to as a S11 parameter.

The frequency at which the patches 102 experience the minimum return loss may be scaled according to the scaling factor ($\tau$). The frequency at which the patches 102 experience the minimum return loss may inversely proportional to the logarithmic increase along the length of the MSPLPA 100. For example, the frequency at which the patches 102 experience the minimum return loss may decrease with the logarithmic increase of the lengths (L) of the patches 102, the widths (W) of the patches 102, the separation distance (D) between adjacent of the branch lines 106, and/or the length of branch lines 106 along the length of the MSPLPA 100. Thus, the smallest of the patches 102 may include the minimum return loss at the highest frequency and the largest of the patches 102 may include the minimum return loss at the lowest frequency.

The patches 102 may include a selected bandwidth at which the patches 102 may transmit and/or receive the radio frequency signals. The bandwidth of the patches 102 may or may not overlap. For example, the S11 parameters of the patches 102 may not overlap at −10 dB. In embodiments, the bandwidth of the patches 102 may overlap to provide continuous frequency coverage. The bandwidth of the patches 102 may collectively define the bandwidth of the MSPLPA 100. Increasing the number of the patches 102 may increase a bandwidth of the MSPLPA 100 and/or increase the length of the MSPLPA 100.

The patches 102 may include a radiation pattern which is directed perpendicular to the ground plane 112 (e.g., a broadside pattern). The patches 102 may form a null parallel to the ground plane 112.

The printed circuit board 108 and the scaled dielectric 110 may include a homojunction. The homojunction may be an interface between the printed circuit board 108 and the scaled dielectric 110. The printed circuit board 108 and the scaled dielectric 110 may include different doping to provide the homojunction.

The MSPLPA 100 may approximate a frequency independent antenna. The MSPLPA 100 may not be entirely frequency independent due to the thicknesses of the patches 102, the feed line 104, and the branch lines 106 being uniform across the length and width of the MSPLPA 100. However, the MSPLPA 100 may approximate a frequency independent antenna by scaling the lengths (L) of the patches 102, the widths (W) of the patches 102, the separation distance (D) between adjacent of the branch lines 106, and/or the length of branch lines 106, and frequency scaling the effective dielectric constant ($\varepsilon_{reff}$) of the scaled dielectric 110 while keeping the thicknesses of the patches 102, the feed line 104, and the branch lines 106 uniform. Thus, the scaled dielectric 110 may enable the MSPLPA 100 to approximate the frequency independent antenna more closely by logarithmically scaling the effective dielectric constant ($\varepsilon_{reff}$), as opposed to maintaining the effective dielectric constant ($\varepsilon_{reff}$) at a constant value along the length of the MSPLPA 100.

The scaled dielectric 110 may be scaled according to the scaling factor ($\tau$). The scaled dielectric 110 may be scaled according to the scaling factor ($\tau$) by scaling the effective dielectric constant ($\varepsilon_{reff}$) along the length of the MSPLPA 100. The effective dielectric constant ($\varepsilon_{reff}$) may be non-constant across the length of the scaled dielectric 110. For example, the effective dielectric constant ($\varepsilon_{reff}$) may be smallest below the smallest of the patches 102 and largest below the largest of the patches 102. The frequency scale of the effective dielectric constant ($\varepsilon_{reff}$) may also frequency scale the effective length (Left) of the patches 102 and similarly the wavelength at which the patches 102 are configured to transmit and/or receive.

The effective dielectric constant ($\varepsilon_{reff}$) may be scaled across the length of the scaled dielectric 110 by including a height (h) which is scaled across the length of the scaled dielectric 110 and/or including a relative dielectric constant ($\varepsilon_r$) which is scaled across the length of the scaled dielectric 110. The relative dielectric constant ($\varepsilon_r$) of the scaled dielectric 110 and the height (h) of the scaled dielectric 110 below each of the patches 102 may frequency scale the effective dielectric constant ($\varepsilon_{reff}$). The height (h) of the scaled dielectric 110 and/or the relative dielectric constant ($\varepsilon_r$) of the scaled dielectric 110 may be non-constant across the length of the MSPLPA 100 by which effective dielectric constant ($\varepsilon_{reff}$) is frequency scaling.

Frequency scaling the height (h) may refer to adjusting the height (h) scaled dielectric 110 according to the scaling factor ($\tau$). The height (h) of the scaled dielectric 110 may change across the length of the MSPLPA 100. Changing the height (h) of the scaled dielectric 110 may also change the height between the patches 102 and the ground plane 112. For example, the height (h) may be scaled using the stepped bottom surface 118-2 and/or the wedged bottom surface 118-3.

Frequency scaling the relative dielectric constant ($\varepsilon_r$) may refer to adjusting the relative dielectric constant ($\varepsilon_r$) according to the scaling factor ($\tau$). The relative dielectric constant ($\varepsilon_r$) may include gradient which increases along the length of the MSPLPA 100 according to the scaling factor ($\tau$). For example, the scaled dielectric 110 may include relative dielectric constant (Era) through relative dielectric constant ($\varepsilon_r$–g). The relative dielectric constant ($\varepsilon_r$) may be smallest (e.g., $\varepsilon_r$–a) below the smallest of the patches 102 (e.g., patch 102*a*) and largest (e.g., Erg) below the largest of the patches 102 (e.g., patch 102*g*). The relative dielectric constant ($\varepsilon_r$) of the scaled dielectric 110 may increase from the smallest of the relative dielectric constant (Era) through the largest of the relative dielectric constant ($\varepsilon_r$–g) according to the scaling factor ($\tau$).

The MSPLPA 100 may provide a thicker dielectric loss tangent (tan $\delta$). The MSPLPA 100 may provide the thicker dielectric loss tangent (tan $\delta$) due to more closely matching the frequency independent antenna. The thicker dielectric loss tangent (tan $\delta$) may enable operating the MSPLPA 100 at much lower frequencies (e.g., at frequencies into the VHF band).

The relative dielectric constant ($\varepsilon_r$) may be adjusted according to the scaling factor ($\tau$) by changing the material from which the scaled dielectric 110 is made and/or changing the fill factor.

One method by which to change the material from which the scaled dielectric 110 is made and/or to change the fill factor may be to additively manufacture the scaled dielectric 110. The additive manufacture may introduce voids to change the fill factor and/or use multiple print heads to change the material. Furthermore, any of the non-planar geometries (e.g., the stepped bottom surface 118-2 and/or the wedged bottom surface 118-3) may be created by the additive manufacturing. The additive manufacturing process may include, but is not limited to, stereolithography (SLA), digital light processing (DLP) printing, and the like. A frequency scaling of an individual patch of the patches 102 with a tailorable height (h) of the scaled dielectric 110 and/or distance between the ground plane 112 and the patches 102, tailorable relative dielectric constant ($\varepsilon_r$) of the scaled dielectric 110, is enabled by additive manufacturing to minimize the number of design iterations for individual of the patches 102 within the MSPLPA 100. The scaling of the relative dielectric constant ($\varepsilon_r$) and the height (h) of the scaled dielectric 110 makes the MSPLPA closer to a self-similar or frequency-independent antenna.

The scaled dielectric 110 may be formed as a monolithic layer. The monolithic layer may be a single piece which is not formed of constituent layers.

FIGS. 2A-2D depict the MSPLPA 100 with the scaled dielectric 110 including the stepped bottom surface 118-2, the ground plane 112 including the stepped top surface 120-2 and the horizontal bottom surface 122-1, and the printed circuit board 114 including the horizontal top surface 124-1 and the horizontal bottom surface 126-1.

FIGS. 3A-3D depict the MSPLPA 100 with the scaled dielectric 110 including the stepped bottom surface 118-2, the ground plane 112 including the stepped top surface 120-2 and the stepped bottom surface 122-2, and the printed circuit board 114 including stepped top surface 124-2 and the horizontal bottom surface 126-1.

FIGS. 4A-4D depict the MSPLPA 100 with the scaled dielectric 110 including the wedged bottom surface 118-3, the ground plane 112 including the wedged top surface 120-3 and the horizontal bottom surface 122-1, and the printed circuit board 114 including the horizontal top surface 124-1 and the horizontal bottom surface 126-1.

FIGS. 5A-5D depict the MSPLPA 100 with the scaled dielectric 110 including the wedged bottom surface 118-3, the ground plane 112 including the wedged top surface 120-3 and the wedged bottom surface 122-3, and the printed circuit board 114 including the wedged top surface 124-3 and the horizontal bottom surface 126-1.

FIGS. 6A-6D depict the MSPLPA 100 with the scaled dielectric 110 including the wedged bottom surface 118-3, the ground plane 112 including the wedged top surface 120-3 and the wedged bottom surface 122-3, and the printed circuit board 114 including the wedged top surface 124-3 and the wedged bottom surface 126-3.

FIGS. 7A-7D depict the MSPLPA 100 with the scaled dielectric 110 including the horizontal bottom surface 118-1, the ground plane 112 including the horizontal top surface 120-1 and the horizontal bottom surface 122-1, and the printed circuit board 114 including the horizontal top surface 124-1 and the horizontal bottom surface 126-1.

Figure 8A:
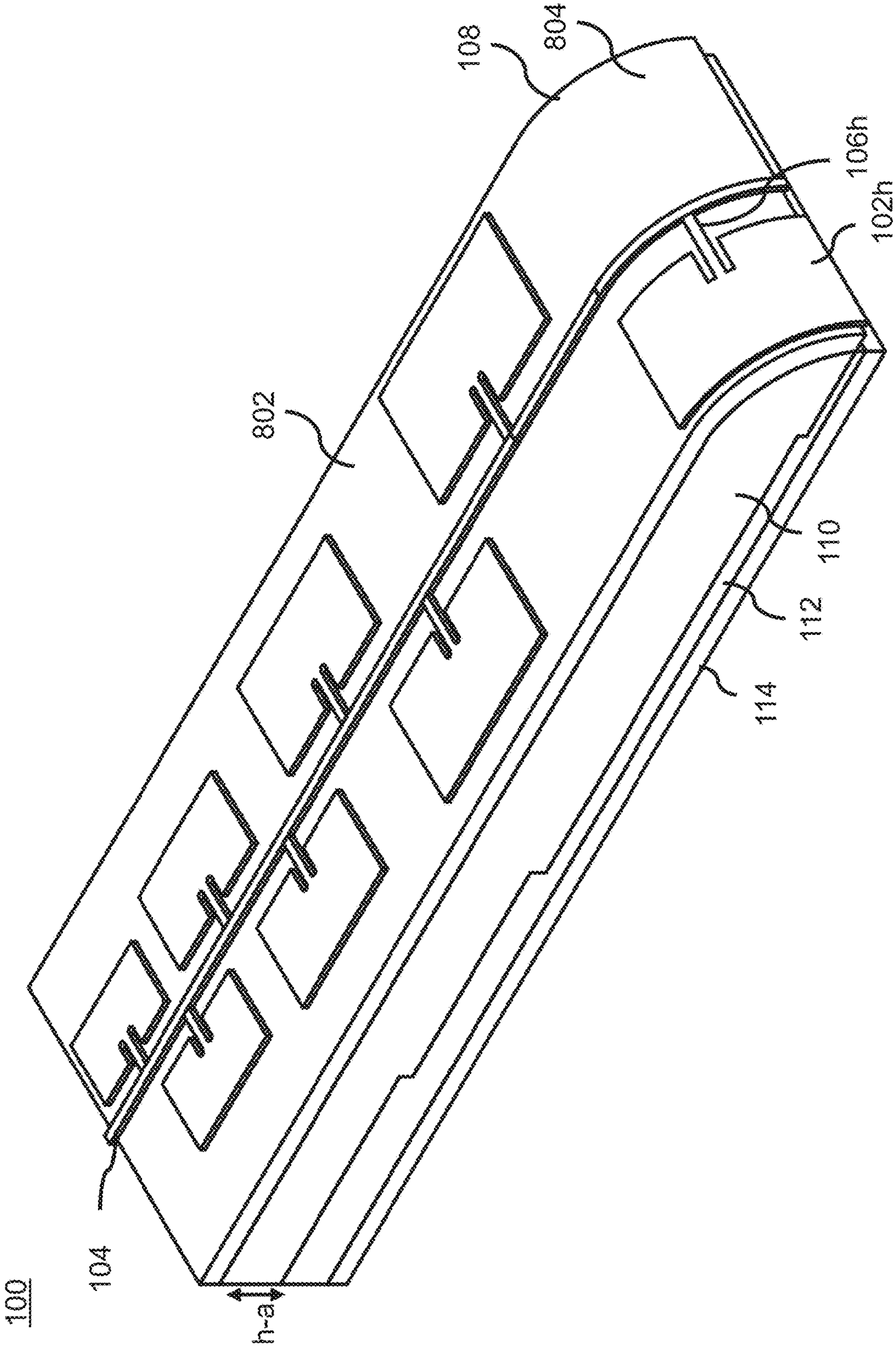
FIG. 8A depicts a top-front perspective view of the MSPLPA of FIGS. 2A-2D with an additional patch which is conformal to a curved surface, in accordance with one or more embodiments of the present disclosure.
Figure 8B:
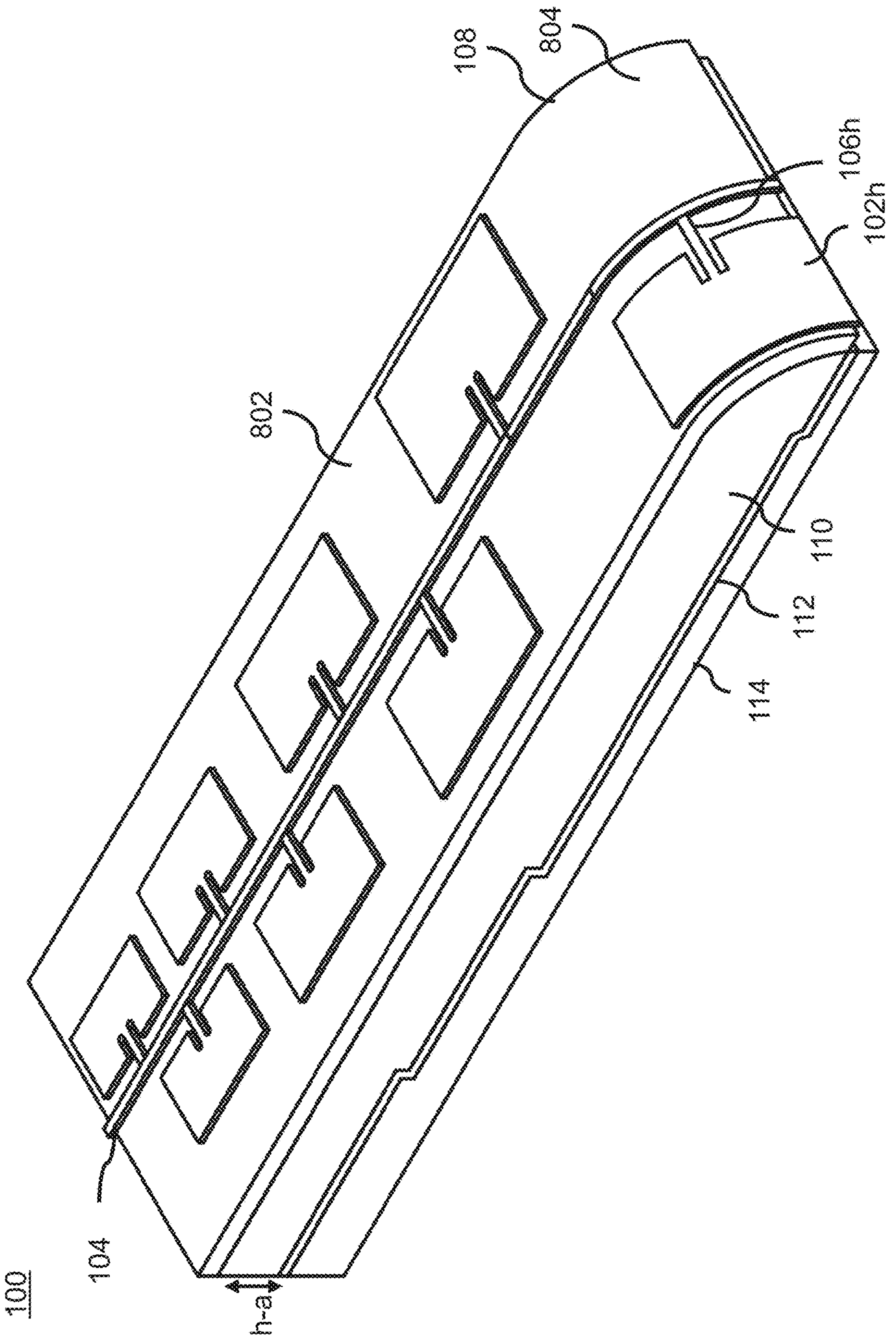
FIG. 8B depicts a top-front perspective view of the MSPLPA of FIGS. 3A-3D with the additional patch which is conformal to the curved surface, in accordance with one or more embodiments of the present disclosure.
Figure 8C:
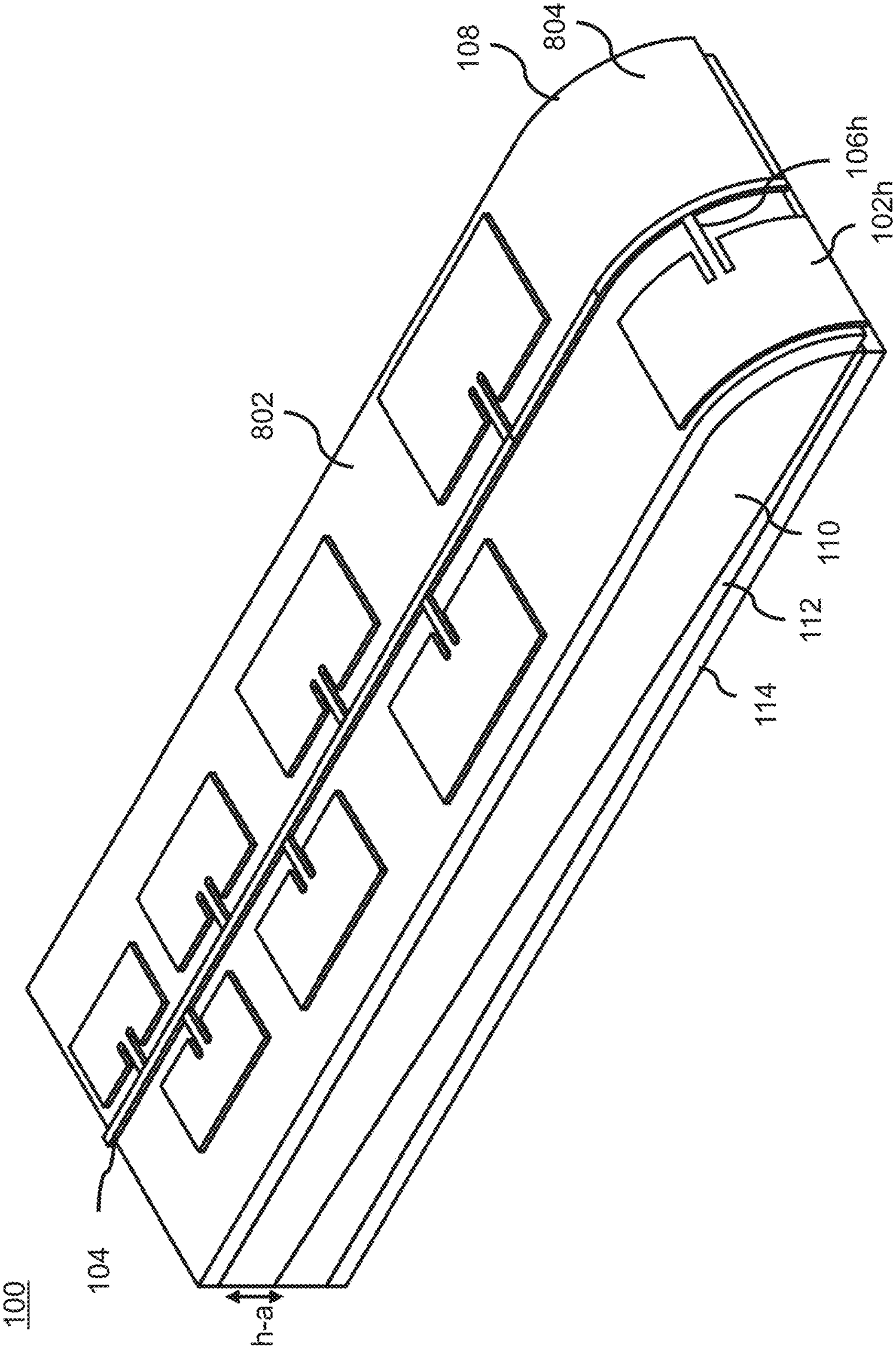
FIG. 8C depicts a top-front perspective view of the MSPLPA of FIGS. 4A-4D with the additional patch which is conformal to the curved surface, in accordance with one or more embodiments of the present disclosure.
Figure 8D:
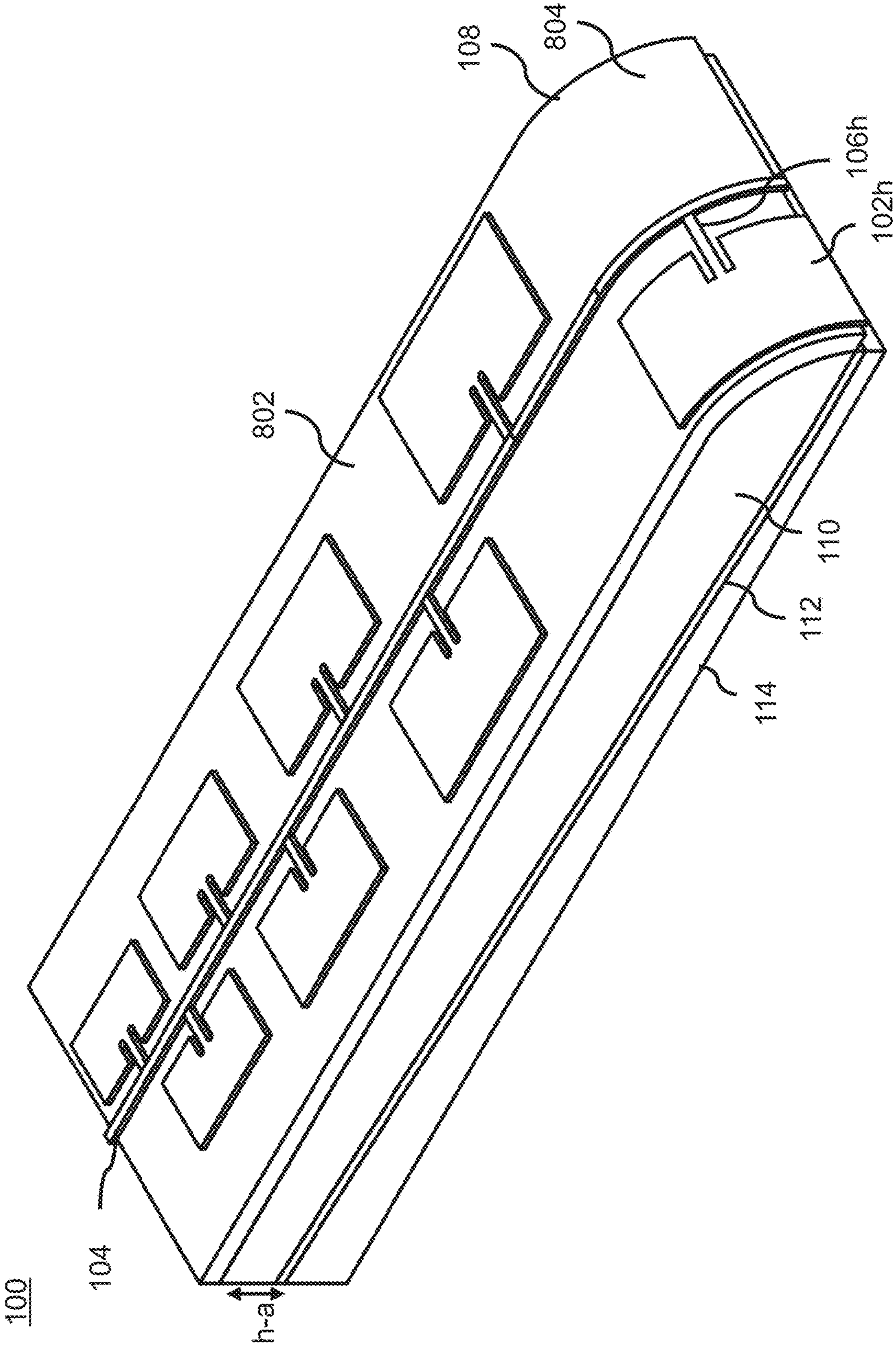
FIG. 8D depicts a top-front perspective view of the MSPLPA of FIGS. 5A-5D with the additional patch which is conformal to the curved surface, in accordance with one or more embodiments of the present disclosure.
Figure 8E:
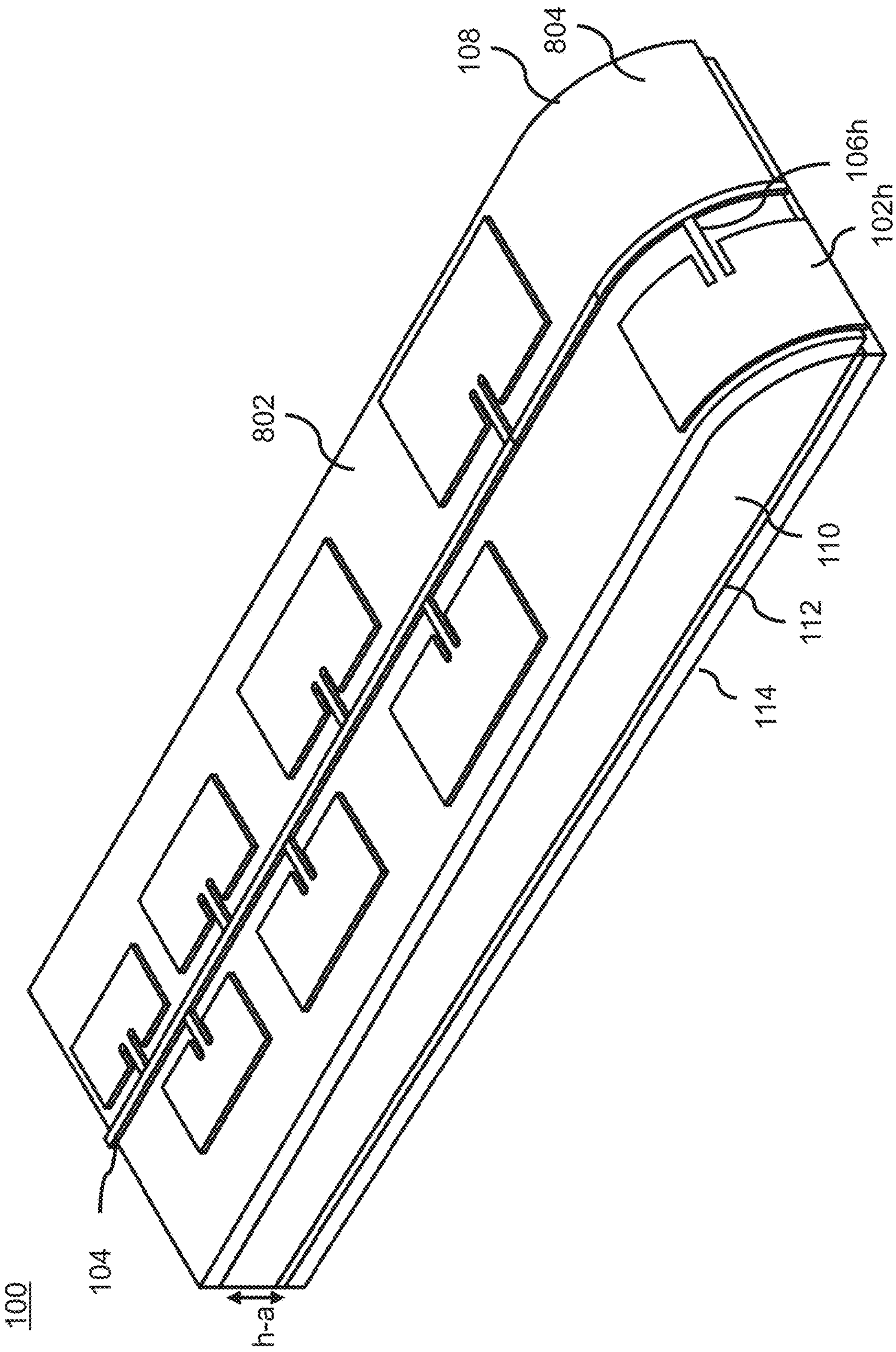
FIG. 8E depicts a top-front perspective view of the MSPLPA of FIGS. 6A-6D with the additional patch which is conformal to the curved surface, in accordance with one or more embodiments of the present disclosure.
Figure 8F:
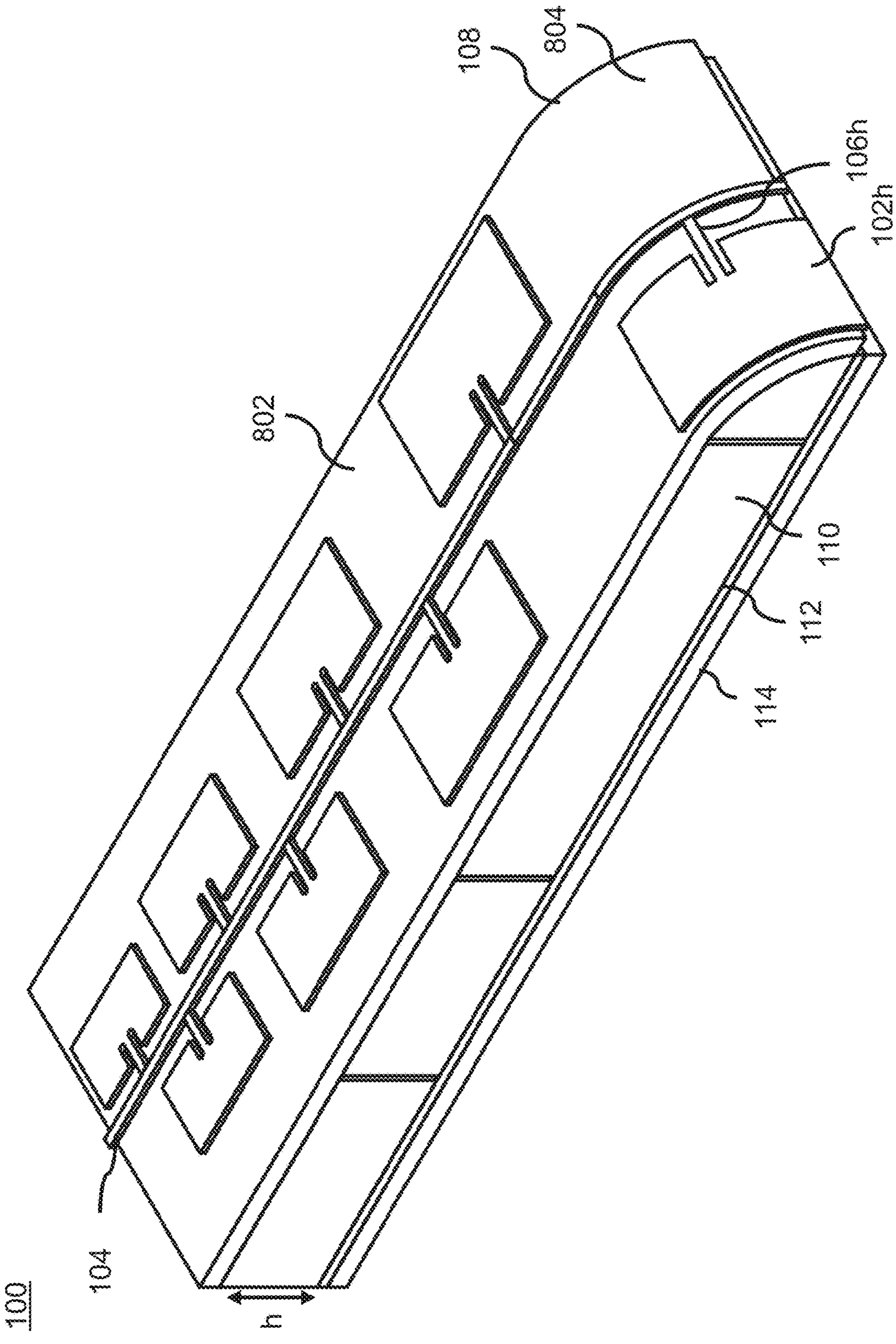
FIG. 8F depicts a top-front perspective view of the MSPLPA of FIGS. 7A-7D with the additional patch which is conformal to the curved surface, in accordance with one or more embodiments of the present disclosure.

FIGS. 8A-8F depict the MSPLPA 100, in accordance with one or more embodiments of the present disclosure. Although the printed circuit board 108 is described as a planar member and the patches 102 are described as forming a planar array, this is not intended as a limitation of the present disclosure. The printed circuit board 108 may be a non-planar member and the patches 102 may form a conformal array. The patches 102 may form a conformal array where the printed circuit board 108 is the non-planar member. Thus, the patches 102 may be conformal to a nonplanar surface.

The conformal array may be a one-dimensional (1D) conformal array or a two-dimensional (2D) conformal array. For example, the MSPLPA 100 is depicted with the 1D conformal array.

The printed circuit board 108 may include a planar surface 802 and/or a curved surface 804. The curved surface 804 may extend from the planar surface 802. The curved surface 804 may include a bend in 1D or 2D. Thus, the curved surface 804 may be a singly curved surface or a doubly curved surface. The curved surface 804 may include any 1D and/or 2D curve geometries. The 1D curve geometries may include cylindrical, hemicylindrical, or the like. The 2D curve geometries may include a spherical, a hemispherical, or the like.

One or more of the patches 102 may be disposed to the planar surface 802 and/or the curved surface 804 of the printed circuit board 108. For example, the MSPLPA 100 may include patch 102*a* through patch 102*h*. The patch 102*a* through patch 102*g* may be conformal to the planar surface 802 of the printed circuit board 108. The patch 102*a* through patch 102*g* may form the planar array. The patch 102*h* may be conformal to the curved surface 804 of the patch 102*h*. Thus, the patches 102 may form a 1D conformal array.

The one or more of the patches 102 which are conformal to the curved surface 804 may be log-periodic with the patches 102 which are conformal to the planar surface 802. The patch 102*h* may be log-periodic with the patch 102*a* through patch 102*g*. Thus, the log-periodic array may also be a 1D conformal array.

Providing the one or more of the patches 102 conformal to the curved surface 804 of the printed circuit board 108 may change the radiation pattern of the MSPLPA 100. The patches 102 which are conformal to the planar surface 802 of the printed circuit board 108 may include the radiation pattern which is directed parallel to the ground plane 112 and the patches 102 which are conformal to the curved surface 804 of the printed circuit board 108 may provide a radiation pattern which is orthogonal to the ground plane 112. For example, the patch 102*h* may provide forward-facing coverage for the MSPLPA 100. The MSPLPA 100 may be desirable in one or more mobile platform due to a forward-facing coverage.

Additive manufacturing may be utilized to account for 1 D/2D varying heights of the scaled dielectric 110, while accounting for bending around 1D/2D surfaces (i.e., corners) for ease of antenna manufacturing.

Figure 9A:
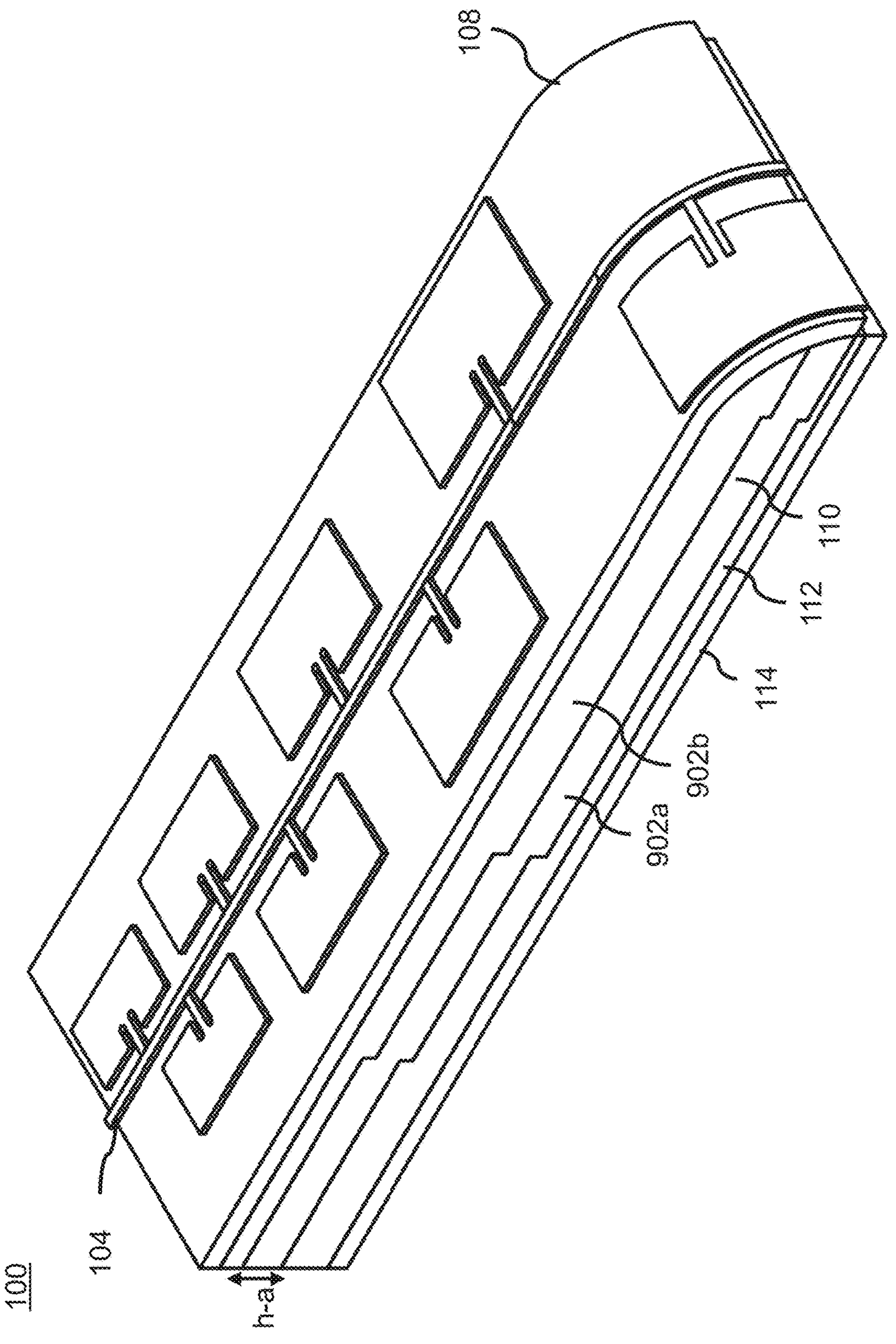
FIG. 9A depicts a top-front perspective view of the MSPLPA of FIG. 8A with a scaled dielectric which is formed from a stack of layers, in accordance with one or more embodiments of the present disclosure.
Figure 9B:
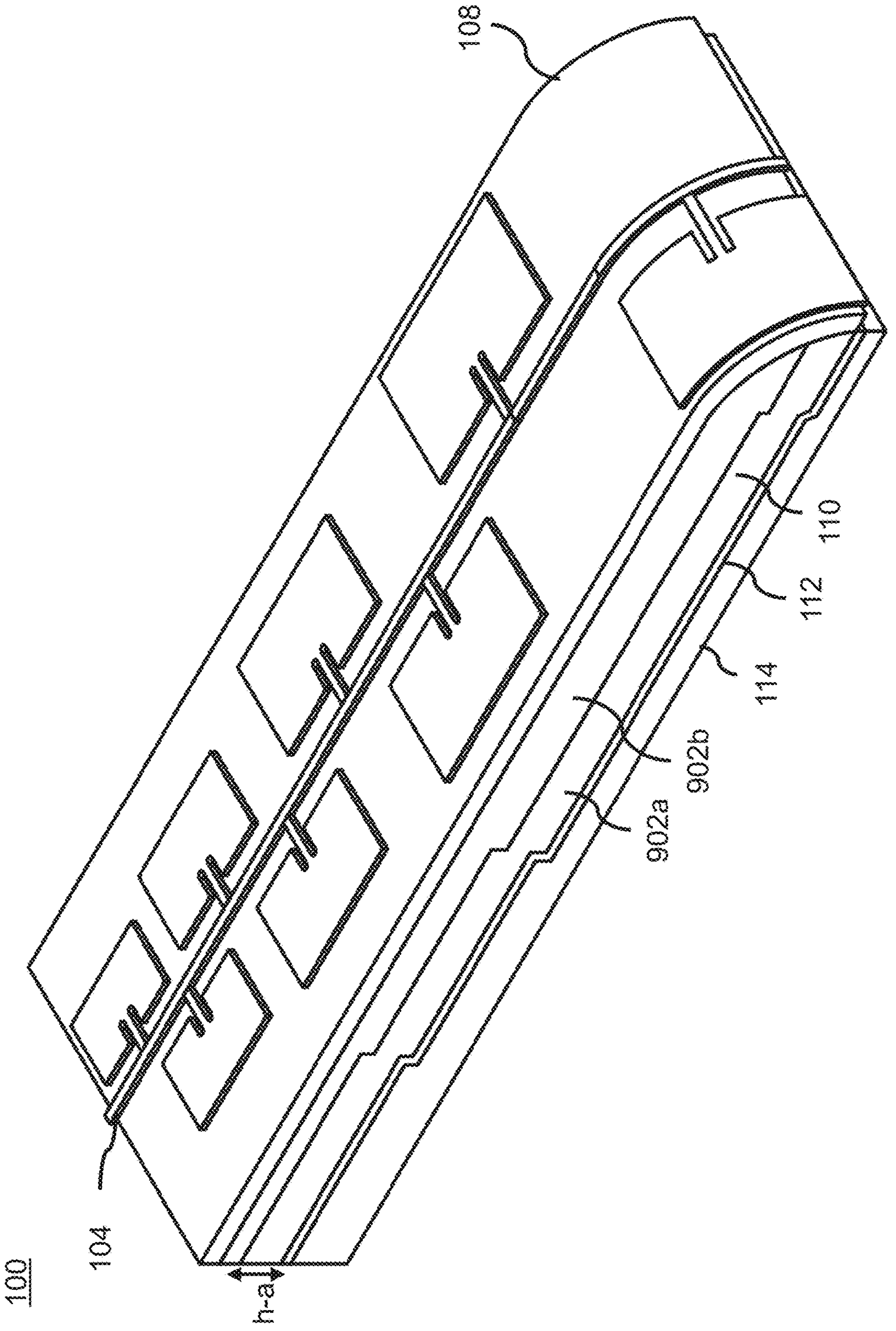
FIG. 9B depicts a top-front perspective view of the MSPLPA of FIG. 8B with a scaled dielectric which is formed from a stack of layers, in accordance with one or more embodiments of the present disclosure.
Figure 9C:
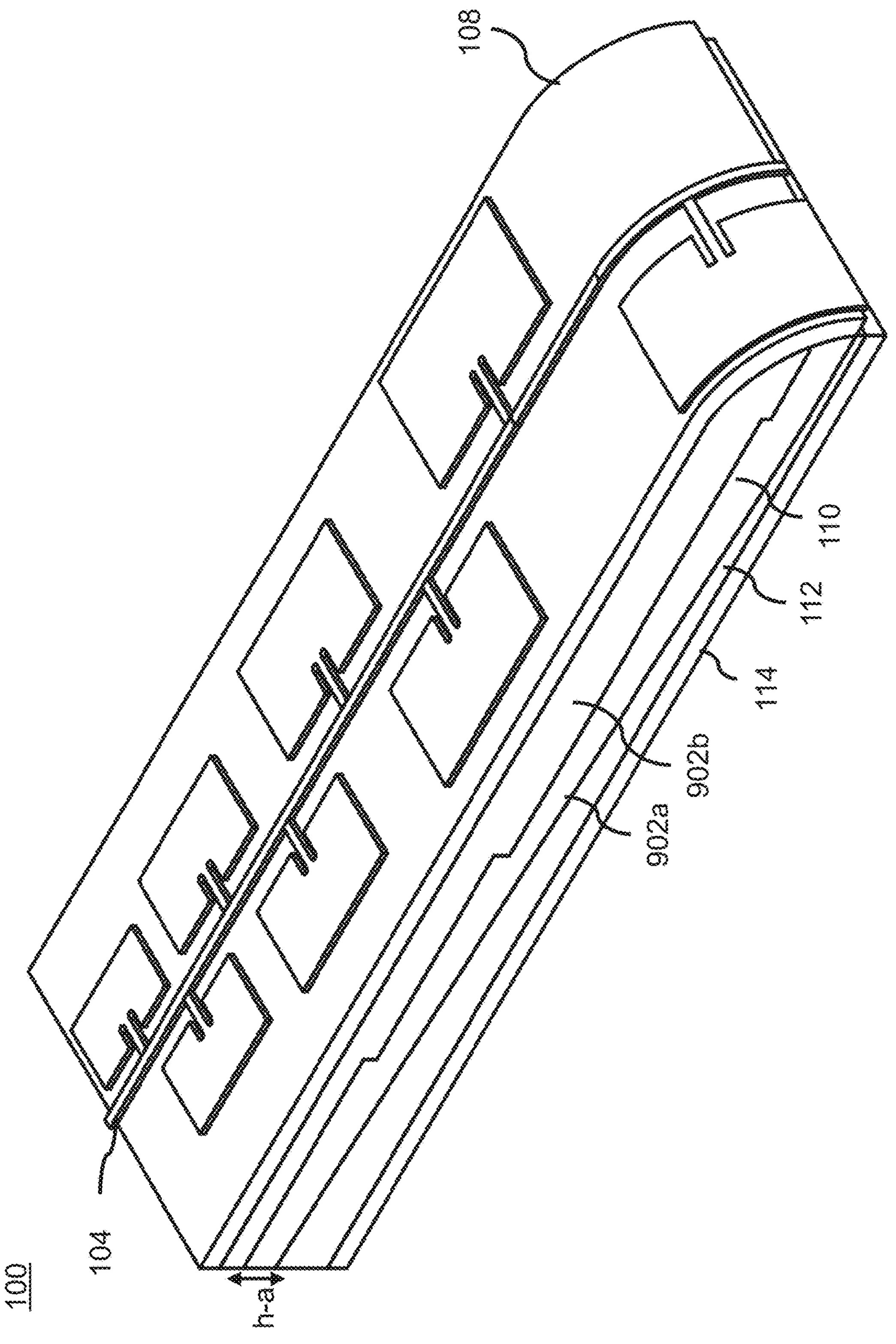
FIG. 9C depicts a top-front perspective view of the MSPLPA of FIG. 8C with scaled dielectric which is formed from a stack of layers, in accordance with one or more embodiments of the present disclosure.
Figure 9D:
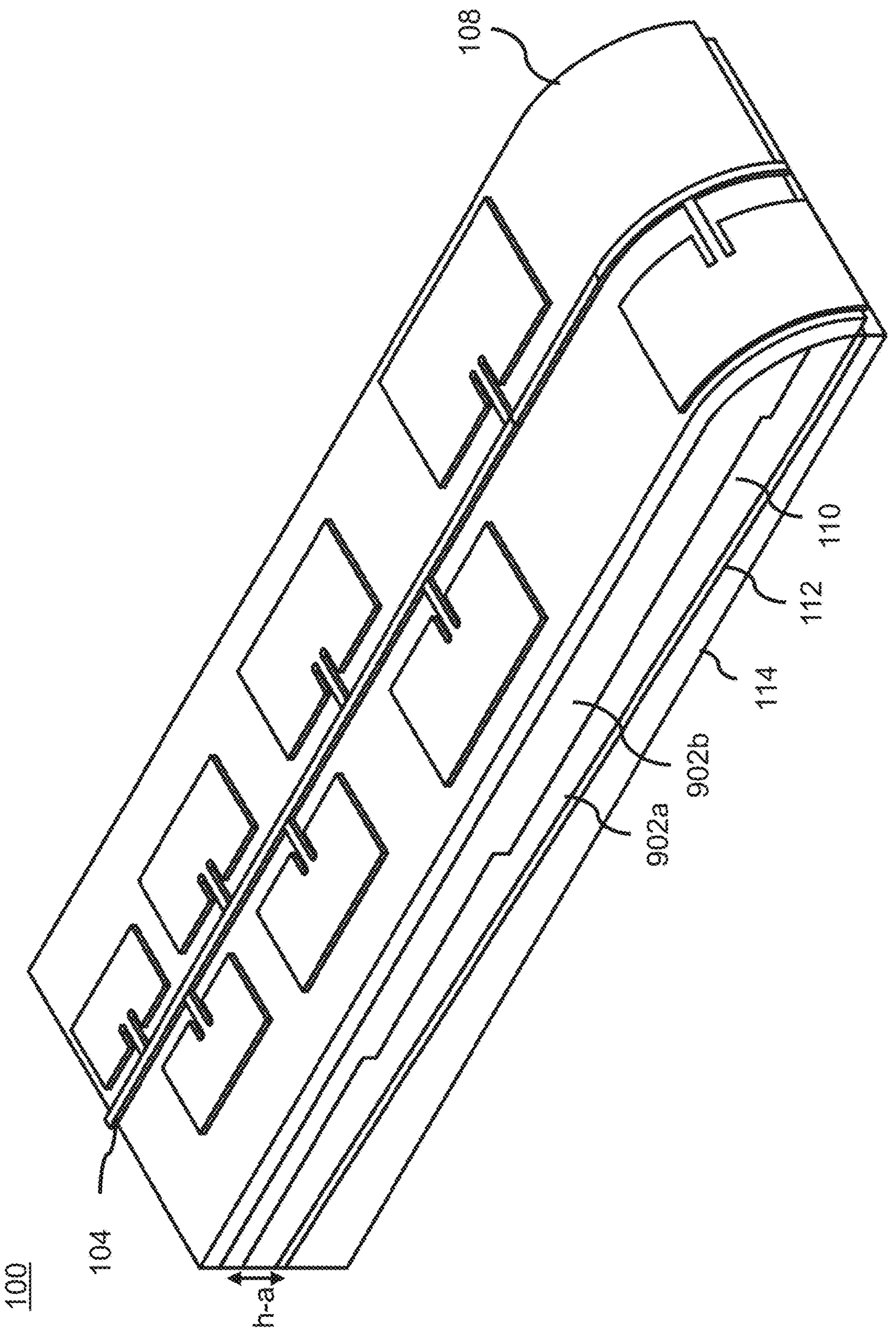
FIG. 9D depicts a top-front perspective view of the MSPLPA of FIG. 8D with scaled dielectric which is formed from a stack of layers, in accordance with one or more embodiments of the present disclosure.
Figure 9E:
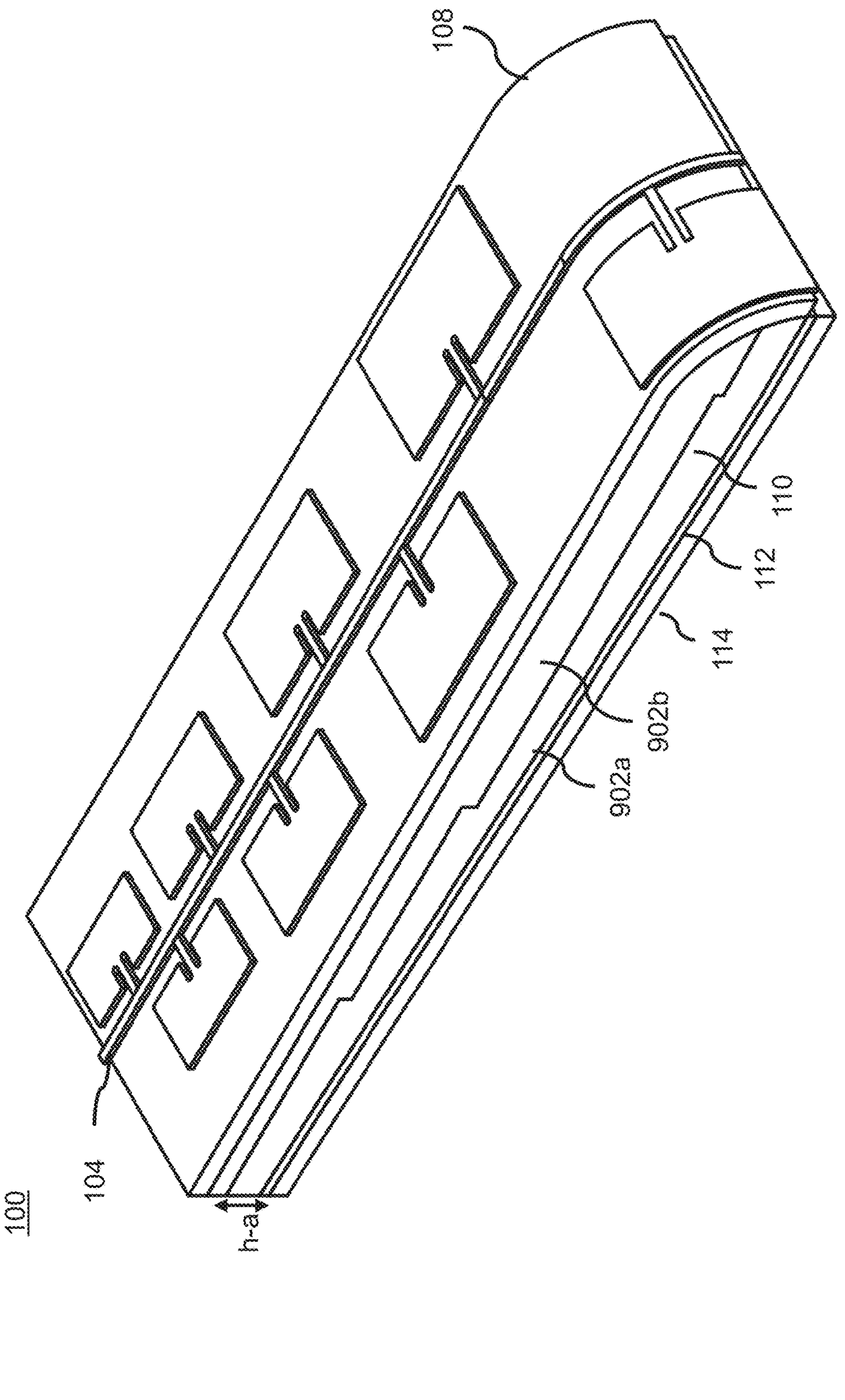
FIG. 9E depicts a top-front perspective view of the MSPLPA of FIG. 8E with scaled dielectric which is formed from a stack of layers, in accordance with one or more embodiments of the present disclosure.
Figure 9F:
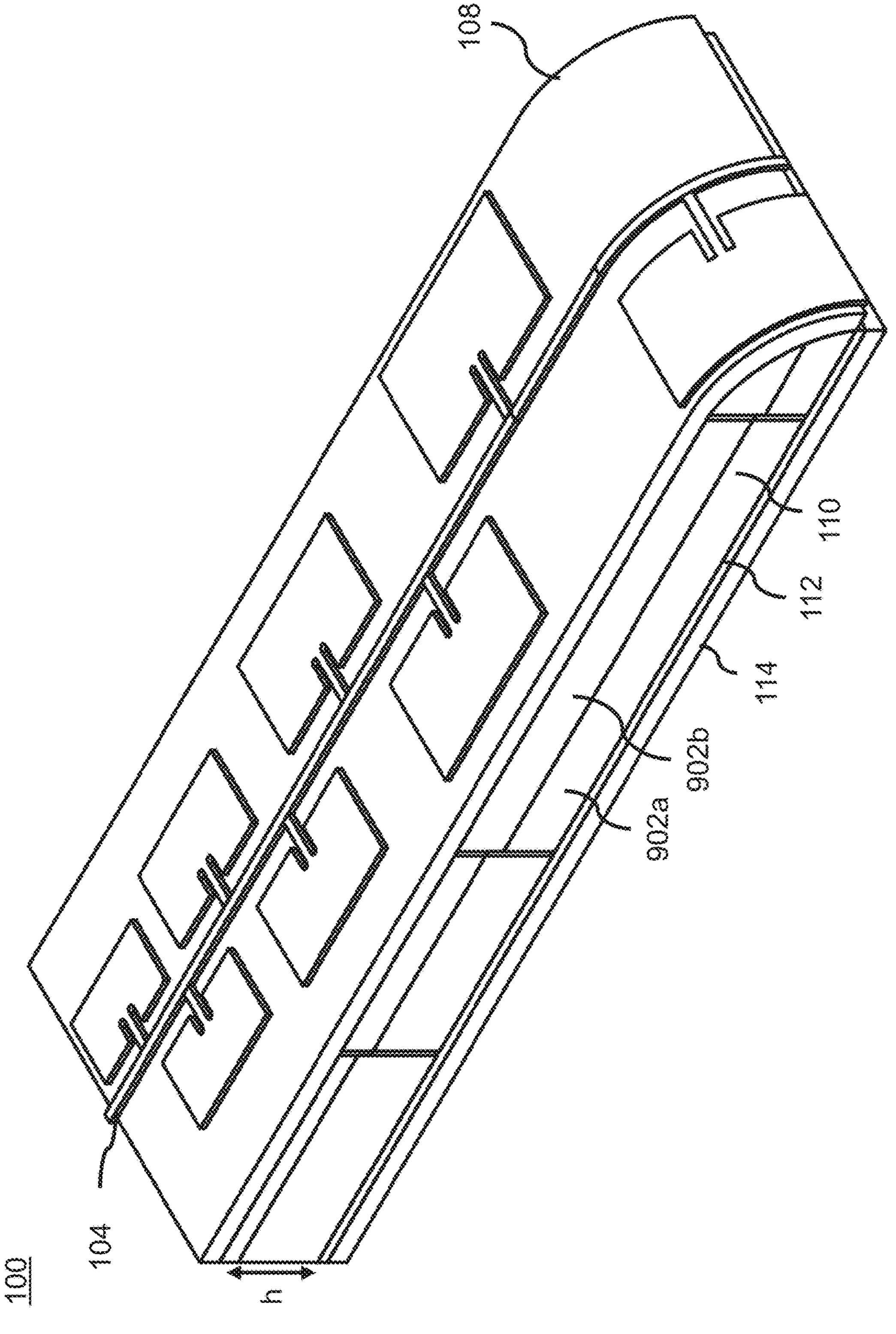
FIG. 9F depicts a top-front perspective view of the MSPLPA of FIG. 8F with scaled dielectric which is formed from a stack of layers, in accordance with one or more embodiments of the present disclosure.

FIGS. 9A-9F depict the MSPLPA 100, in accordance with one or more embodiments of the present disclosure. Although the scaled dielectric 110 is described as a monolithic layer, this is not intended as a limitation of the present disclosure. It is contemplated that the scaled dielectric 110 may be formed as a stack of layers 902. The stack may include any integer number of the layers 902. For example, the MSPLPA 100 is depicted with two of the layers 902 (e.g., layer 902*a* and layer 902*b*), although this is not intended to be limiting. The stack of layers 902 may be joined together by a nonconductive adhesive or the like. The layers 902 in the stack may or may not include a uniform height (h) and/or relative dielectric constant ($\varepsilon_r$). The layers 902 in the stack may not include a uniform relative dielectric constant ($\varepsilon_r$) by being made of different materials or by including a different fill factor. Thus, the relative dielectric constant ($\varepsilon_r$) of the scaled dielectric 110 may vary along both the length and the height of the MSPLPA 100. The scaled dielectric 110 may be written starting from the ground plane 112 with varying dielectric materials density (i.e., the incorporation or air gaps in the dielectric's 3D lattice to modulate the relative dielectric constant ($\varepsilon_r$)). Also, the height and curvature of the scaled dielectric 110 may be accommodated with the write process.

Referring generally again to the figures.

The scaled dielectric 110 may bond with the ground plane 112 and/or the printed circuit board 108 for ease of layer plating.

An experimental result is now described. Four Frequency Scaling's were chosen as an example to extend the bandwidth of a narrowband patch: 1, 0.9835, 0.9714, 0.9596 and 0.4621 that correspond to: 2.38 GHz, 2.42 GHz, 2.44 GHz, 2.48 GHz, and 5.15 GHz patch designs. These scaling settings altered the four patch designs via a uniform scaling operation, however each of these now possessed a unique ground plane thickness. The base design used a 100-mil thick dielectric, thus for the subsequent designs, the thickness were: 98 mils, 97 mils, 95 mils and 50 mils. The larger the bandwidth and thus frequency scale of the patch, the larger variation in patch thickness will be observed. 100, 98, 97, 95 and 50 mils substrates with 1 antenna design iteration shows the capability for tailorable frequency coverage.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period. For example, the memory may be random access memory (RAM), and the results may not necessarily persist indefinitely in the memory.

It is noted herein that the one or more components of system may be communicatively coupled to the various other components of system in any manner known in the art. For example, the one or more processors may be communicatively coupled to each other and other components via a wireline connection or wireless connection.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A microstrip patch log periodic antenna comprising:

a plurality of patches, wherein the plurality of patches are arranged in a log-periodic array, wherein the log-periodic array is periodic according to a scaling factor ($\tau$);

a feed line, wherein the plurality of patches are connected to the feed line in parallel;

a plurality of branch lines, wherein the plurality of branch lines are connected between the feed line and the plurality of patches;

a first printed circuit board, wherein the plurality of patches, the feed line, and the plurality of branch lines are disposed on the first printed circuit board;

a scaled dielectric, wherein the first printed circuit board is disposed on the scaled dielectric, wherein the scaled dielectric includes a top surface, a bottom surface, and a height (h) defined between the top surface and the bottom surface;

a ground plane, wherein the scaled dielectric is disposed on the ground plane, wherein a top surface of the ground plane conforms to the bottom surface of the scaled dielectric; and a second printed circuit board, wherein the ground plane is disposed on the second printed circuit board, wherein a top surface of the second printed circuit board conforms to a bottom surface of the ground plane;

wherein the scaled dielectric comprises an effective dielectric constant ($\varepsilon_{eff}$), wherein the effective dielectric constant ($\varepsilon_{eff}$) is scaled according to the scaling factor ($\tau$).

2. The microstrip patch log periodic antenna of claim 1, wherein the plurality of patches are one of rectangular, square, circular, elliptical, triangular, disc sectors, or ring sectors.

3. The microstrip patch log periodic antenna of claim 1, wherein adjacent of the plurality of patches are disposed on alternating sides of the feed line.

4. The microstrip patch log periodic antenna of claim 1, wherein the plurality of branch lines couple to the plurality of patches via one of an inset feed or a proximity coupling.

5. The microstrip patch log periodic antenna of claim 1, wherein the height (h) of the scaled dielectric is constant along a length of the microstrip patch log periodic antenna.

6. The microstrip patch log periodic antenna of claim 1, wherein the height (h) of the scaled dielectric is not constant along a length of the microstrip patch log periodic antenna.

7. The microstrip patch log periodic antenna of claim 6, wherein the bottom surface of the scaled dielectric is a stepped bottom surface.

8. The microstrip patch log periodic antenna of claim 7, wherein steps of the stepped bottom surface are disposed below respective of the plurality of patches.

9. The microstrip patch log periodic antenna of claim 8, wherein a shortest step of the stepped bottom surface is disposed below a smallest of the plurality of patches and a tallest step of the stepped bottom surface is disposed below a largest of the plurality of patches.

10. The microstrip patch log periodic antenna of claim 9, wherein adjacent of the plurality of patches are disposed on alternating sides of the feed line, wherein the stepped bottom surface comprises alternate stepping.

11. The microstrip patch log periodic antenna of claim 7, wherein the bottom surface of the ground plane is one of a horizontal bottom surface or a stepped bottom surface.

12. The microstrip patch log periodic antenna of claim 6, wherein the bottom surface of the scaled dielectric is a wedged bottom surface, wherein the wedged bottom surface is set at an incline to the plurality of patches.

13. The microstrip patch log periodic antenna of claim 12, wherein a shortest portion of the wedged bottom surface is disposed below a smallest of the plurality of patches and a tallest portion of the wedged bottom surface is disposed below a largest of the plurality of patches.

14. The microstrip patch log periodic antenna of claim 12, wherein the bottom surface of the ground plane is a horizontal bottom surface, wherein a bottom surface of the second printed circuit board is a horizontal bottom surface.

15. The microstrip patch log periodic antenna of claim 12, wherein the bottom surface of the ground plane is a wedged bottom surface, wherein a bottom surface of the second printed circuit board is one of a horizontal bottom surface or a wedged bottom surface.

16. The microstrip patch log periodic antenna of claim 1, wherein the scaled dielectric comprises a relative dielectric constant ($\varepsilon_r$), wherein the effective dielectric constant ($\varepsilon_{eff}$) is proportional to the relative dielectric constant ($\varepsilon_r$), wherein the relative dielectric constant ($\varepsilon_r$) is scaled according to the scaling factor ($\tau$).

17. The microstrip patch log periodic antenna of claim 16, wherein the relative dielectric constant ($\varepsilon_r$) is smallest below a smallest of the plurality of patches and largest below a largest of the plurality of patches.

18. The microstrip patch log periodic antenna of claim 1, wherein the first printed circuit board is a planar member, wherein the plurality of patches form a planar array.

19. The microstrip patch log periodic antenna of claim 1, wherein the plurality of patches form a conformal array.

20. The microstrip patch log periodic antenna of claim 19, wherein the first printed circuit board comprises a planar surface and a curved surface, wherein one or more of the plurality of patches are disposed on the planar surface and one or more of the plurality of patches are disposed on the curved surface, wherein the conformal array is a one-dimensional conformal array.

* * * * *